(12) United States Patent
Mann et al.

(10) Patent No.: US 6,310,883 B1
(45) Date of Patent: Oct. 30, 2001

(54) TRAFFIC ROUTE FINDER IN COMMUNICATIONS NETWORK

(75) Inventors: Jason Warren Mann, Borehamwood; John Ian Turner, Royston, both of (GB); Anthony Richard Phillip White, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/044,889

(22) Filed: Mar. 20, 1998

(30) Foreign Application Priority Data

Dec. 24, 1997 (GB) .................................................. 9727163

(51) Int. Cl.$^7$ .................................................. H04L 12/44
(52) U.S. Cl. .................................................. 370/408
(58) Field of Search .................................. 370/401, 402, 370/407, 408, 409, 410, 351, 352, 254, 255, 256, 257, 258, 248; 709/223, 224, 225, 226, 238, 239, 240, 241, 242, 243, 244, 252

(56) References Cited

U.S. PATENT DOCUMENTS 5,309,370 * 5/1994 Wong .
5,317,566   5/1994 Joshi ..................................... 370/60
5,491,692 * 2/1996 Gunner et al. ...................... 370/402

FOREIGN PATENT DOCUMENTS 2299729   10/1996 (GB) .
2305811    4/1997 (GB) .
WO 97/11553  3/1997 (WO) ........................... H04M/15/00

* cited by examiner

*Primary Examiner*—Huy D. Vu
(74) *Attorney, Agent, or Firm*—Lee, Mann, Smith, McWilliams, Sweeney & Ohlson

(57) ABSTRACT

A route finder for point to multi-point connection requests in a communications network comprising a plurality of nodes connected by a plurality of links. A cost is assigned to each network link. For each connection request a set of all network nodes not included in its source node or its plurality of destination nodes are selected. An array of bits is created with an array element corresponding to a selected node element having a value of 1 if the node is steiner vertex for a steiner tree of nodes not selected, otherwise the array element has a value of 0. Each array is treated as a bit string and considered as population members which are manipulated by genetic algorithms. The fitness of the population members is evaluated by calculating the cost of traversing the routes represented by the bit strings. The method is capable of routing a plurality of multi-point connection requests, and selecting an overall optimum solution.

14 Claims, 24 Drawing Sheets

[nodes] ~1201
n_1 {031} ~1202
n_2 {461}
n_3 {101}

[links] ~1203
{n_1 1} {n_2 1} 622 NetworkLinkDuplex ~1204
{n_1 2} {n_3 1} 602 NetworkLinkDuplex
{n_2 2} {n_3 1} 622 NetworkLinkDuplex

[linkstate] ~1205
{n_1 1} {n_2 1} 402 ~1206

[nodestate] ~1207
n_1 1  ~1208

[linkReliability] ~1209
{n_1 1} {n_2 1} 0.999 ~1210

[nodeReliability] ~1211
n_1 0.999 ~1212

[costs] ~1213
{n_1 1} {n_2 3} {{data 1} voice 2}} ~1214

Fig. 12

[traffic] ~1601
983 n_1 n_8 165 data {5*} ~1602
984 n_2 n_7 210 voice {2 50 50} ~1603

[multipoint] ~1604
985 n_1 {n_2 n_3} 160 ~1605

~1606
[constraints]
983 {include links}{{n_1 1}{n_2 1} {n_2 2}{n_3 2}}} ~1607
983 {exclude nodes {n_5 n_6}} ~1608

Fig. 16

[problemparameters] ~1701 pathlengthWeight=10 ~1702 balancingWeight=5 ~1703

[gaparameters] ~1704 steps=1000 statsUpdateFreq=500

Fig. 17

[routes] ~2201

{983 n_1 n_8 data{{n_1 1}{n_2 1}{n_6 1}{n_8 1}} ~2202
{984 n_2 n_7 voice {{n_2 2}{n_4 1}{n_5 1}{n_7 1}}

Fig. 22

TRAFFIC ROUTE FINDER IN COMMUNICATIONS NETWORK

FIELD OF THE INVENTION

The present invention relates to a method of finding routes for connections across a communications networks comprising a plurality of node elements connected by a plurality of link elements, and particularly although not exclusively to a method of finding an optimized routing for a plurality of point to multipoint connections.

BACKGROUND TO THE INVENTION

A conventional broadband circuit switched communications network, for example a telephony network or a mobile phone network, comprises a plurality of nodes, at which are provided node equipment, the nodes connected by a plurality of communications links, the links comprising link equipment. The node equipment may comprise, for example a telecommunications switch apparatus, and the links may comprise a terrestrial link, eg an optical fiber link or coaxial cable or a wireless link.

An increasing range of services are delivered over such networks, including as examples, video on demand, video conferencing, distance learning, and internet services. Such services involve delivering different traffic data types, eg voice traffic, video or computer data traffic, having different characteristics, some types of traffic being more sensitive to delay than others and the different traffic types having different ranges of bitrate requirements. These services may involve delivery of data from a single source to a single destination (point to point) from a single source to many destinations (point to multipoint) or from a plurality of sources to a plurality of destinations (multipoint to multipoint). Such services place heavy requirements for routing of connections supporting these services over a network.

Conventional route finding methods, such as Dijkstra's shortest path algorithm, are capable of finding a single route for a single connection (E W Dijkstra, "A Note on Two Problems in Connection with Graphs", Numerische Mathematik 1, pg 269, 1959). However, using a shortest path routing algorithm on a connection-by-connection basis can lead to sub-optimal or even highly congested network routing solutions. Additionally, in a telecommunications network, there are constraints other than finding the shortest route to consider. For example, it may be useful to take into account traffic flowing through the network resulting from other connections, and link and node bandwidth capacities.

In WO 96/31969 there is disclosed a method of routing traffic from a communications network which uses a genetic algorithm search routine to find optimum sets of paths between nodes in a network for routing of traffic on a point to point connection basis with the object of minimizing a number of communications channels used, and to reduce a risk of a communications system being unable to handle a high volume of traffic.

In WO 96/31969, a set of shortest paths forms the basis for an initial string population of the genetic algorithm. Routes are selected according to a fitness criteria which includes a user specified weighting based on a number of channels required to support traffic, utilization of links represented as a number of links whose capacity could be exceeded, and a user specified "path cost" comprising a sum of costs of a plurality of links of a path between nodes. The user can vary the fitness criteria by altering the respective weighting given to the path cost, utilization, and number of channels in order to customize the genetic algorithm process to select for these criteria according to an importance as reflected in the user specified weightings.

However, shortest path routing, even as optimized by genetic algorithm technique, cannot provide solutions for point to multipoint routing. Further, shortest path routing cannot deal with service requests for mixed traffic data types.

SUMMARY OF THE INVENTION

Users of services delivered over such a communications network may make requests for services to be carried over the network, specifying a plurality of connections each between a source node and one or more destination nodes. Such service requests do not usually specify a route of nodes and links in the network which should be taken between the source and destination nodes.

One object of the present invention is to find routes for connections specified in a service request in a manner which takes into account a plurality of service requests simultaneously rather than one service request at a time.

Another object is to balance routing of connections across the network. For instance, if two connections would ideally include a same link in a shortest path, but this could result in either that link becoming overloaded or one of the connections needing to take a much longer route, then it may be beneficial for one or both of the connections to be routed over slightly longer routes in order to avoid network congestion, thereby resulting in a more even distribution of network link and node utilization.

Another object of the present invention is to provide a capability to include or exclude certain nodes or links from routes found for a particular connection, for example if it is known that a particular network node equipment is not working properly or for security reasons.

A further object is to provide a generic route finding means which is reusable for circuit switched communications networks using different transport protocol types.

Suitably, the generic route finder means takes a modularized embodiment capable of being installed in a network controller or network manager, and acting as a server for a plurality of other network management applications.

A further object of the present invention is to route connections in a communications network according to a type of traffic which is to be carded.

A further object of the present invention is to distribute traffic of a service connection over a plurality of routes.

A further object of the present invention is to distribute point to multi-point traffic over a network.

According to a first aspect of the present invention there is provided a method of finding routes of links for a plurality of communications connections over a network comprising a plurality of node elements and link elements, each said connection having a source node element and a plurality of destination node elements, said method comprising the machine executable steps of:

assigning at least one link cost to each said link element;
for each said connection to be routed:
   selecting a set of node elements of said network which are not included in a source node element or a plurality of destination node elements of said connection;
   determining which of said node elements in said set are Steiner Vertices;

evaluating a route cost of traversing a plurality of link elements between said source node elements and said plurality of destination node elements; and for all said connections to be routed, evaluating a total cost of said route costs.

Preferably said set of node elements is represented by a string of bits, a bit in said string having a value of 1 if said node element it represents is marked as a Steiner Vertex, and a bit in said string having a value of 0 if said node element it represents is not marked as a Steiner Vertex.

Preferably, said step of evaluating a route cost comprises the steps of:

creating a Steiner tree including nodes in each said connection to be route and nodes in said set which are marked as Steiner Vertices; and adding costs of traversing each link in said Steiner tree.

Preferably, said string of bits is manipulated using genetic algorithm operations, including reproduction, mutation, crossover and merging.

Said cost(s) assigned to said link element are associated with a data type, and said method may comprise the step of assigning a data type to all or some of said connections to be routed.

According to a second aspect of the present invention, there is provided a method of determining a plurality of routes for a plurality of connections across a network comprising a plurality of nodes and links, each said connection between a source node and a plurality of destination nodes, said method comprising the steps of:

generating a network representation data of said network, said network representation data describing a plurality of interconnected nodes and links;

for each said connection generating a plurality of bit representations of intermediate nodes between said source node and said destination nodes;

for each said connection, evaluating a cost of a set of routes corresponding to a said intermediate node by decoding a said bit representation as a minimum spanning tree representation;

for all said connections, evaluating a total cost of all corresponding said routes, from said plurality of costs evaluated for said plurality of minimum spanning trees.

Preferably, said step of generating a plurality of bit representations of nodes comprises operating a genetic algorithm technique to produce a plurality of bit strings, each said bit string containing a plurality of said bit representations of nodes, such that each said bit string contains a bit representation of a node for each said connection request.

Said intermediate nodes preferably comprise Steiner Vertices.

According to a third aspect of the present invention there is provided a method of determining a plurality of routes for a plurality of connections across a network comprising a plurality of nodes and links, each said connection having a source node and a plurality of destinations nodes, said method comprising the steps of:

generating a network representation data of said network, said network representation data describing a plurality of interconnected nodes and links of said network wherein each link is assigned a link cost data;

for each of said plurality of connections, representing a plurality of routes of said connection as a minimum spanning tree of nodes and links connecting said source node and said destination nodes of said connections;

for each said connection evaluating a cost of routes represented by said corresponding minimum spanning tree from a plurality of link costs assigned to links of said minimum spanning tree; and determining a total cost of all said connections from said plurality of costs evaluated for each said minimum spanning tree.

Methods for routing of connections according to the present invention may have application in network design. Simulating a number of connections can identify any unnecessary links in the network, eg links which are used lightly or not at all. Important links in the network may also be identified by applying conventional routing algorithms and techniques, for example heavily loaded links or links which are potential bottlenecks.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 12 illustrates the contents of a text file which may be entered into the route finder engine, possibly from the data editors shown in FIG. 10 and FIG. 11;

FIG. 16 illustrates an example of a file which may be entered into the route finder, possibly produced by the data editors shown in FIG. 13 and FIG. 14;

FIG. 17 illustrates an example of a file which may be entered into the route finder defining evaluation function related parameters;

FIG. 22 illustrates an example of an output file produced by the route finder engine;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
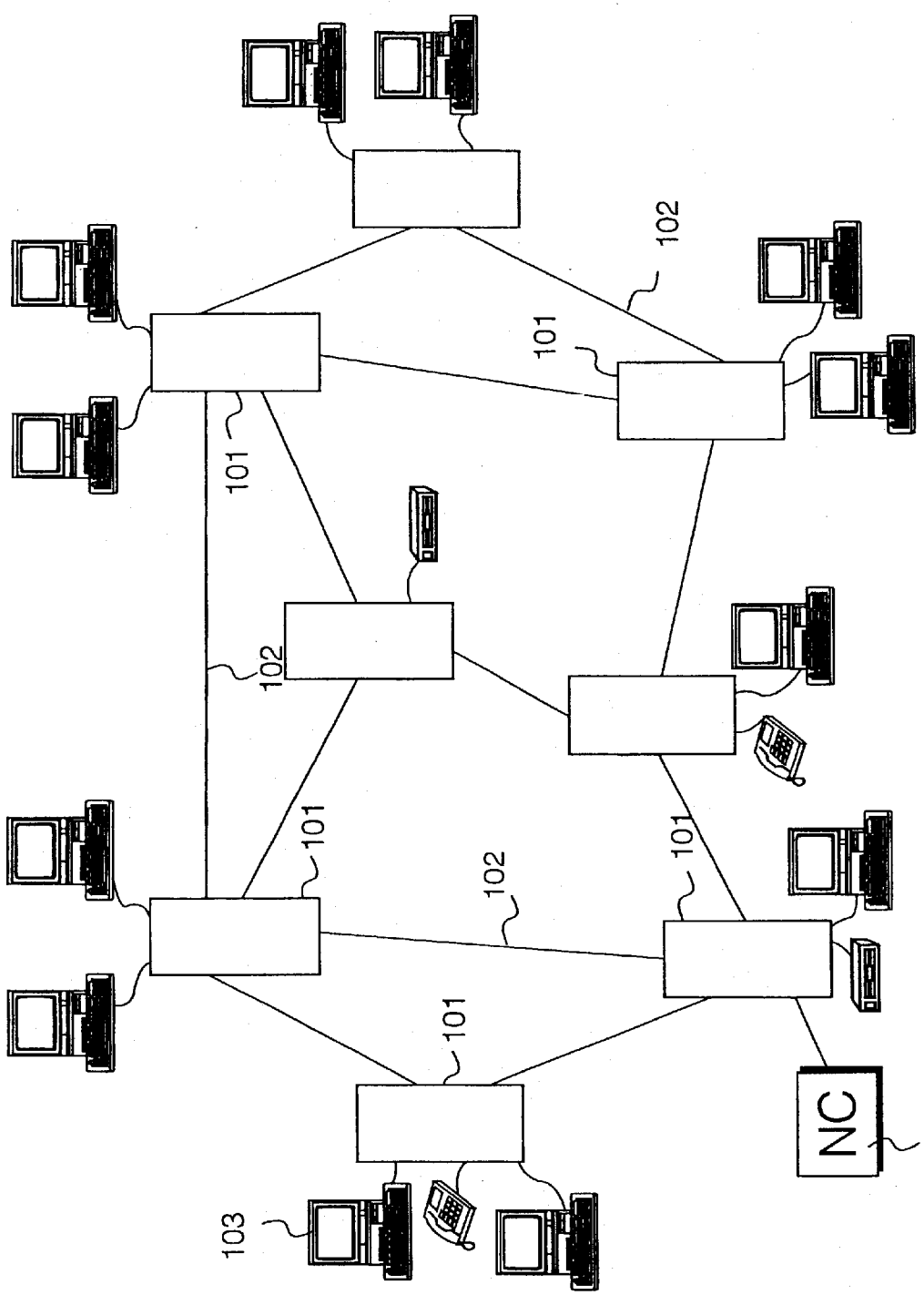
FIG. 1 illustrates schematically a broadband communications network including a plurality of node equipment, a plurality of link equipment and a network controller.

Referring to FIG. 1 herein there is shown schematically a circuit switched communications network comprising a plurality of node elements 101 each comprising an item of node equipment for example a switch, and a plurality of link elements 102, connecting the node elements, each link element 102 comprising an item of link equipment, eg terrestrial or wireless communication links. Each item of node equipment may comprise a plurality of individual physical components. Each item of link equipment may comprise one or a plurality of physical components. Each link equipment may support a plurality of communication channels.

In this specification, a "link" is characterized as being a communications path between two nodes, with no intervening nodes.

The communications network may include mobile phone communications apparatus resident at one or more nodes of the network and a node element may comprise a gateway to another network, for example a world wide web gateway. In general, the communications network will comprise a variety of different types of node equipment and a variety of different types of link equipment, made by different manufacturers and having differing performance specifications. In FIG. 1, traffic data signals are transmitted along the link equipment and through the node equipment over a circuit switched path between a source node element and a destination node element. The traffic data is carried between sources and destinations over a plurality of routes across the network.

A network controller 104 may be attached to a node equipment 101, the network controller comprising management functionality for managing routes or connections across the network. In the best mode herein, the network controller comprises a modular route finder component which acts as a server for finding routes for connections in response to service requests generated by a plurality of different network management applications. The route finder component may support other network management applications resident on the network controller, for example the route finder component may support network topology design for Synchronous Digital Hierarchy (SDH)/ Synchronous Optical NETwork (SONET) rings, or network design and bandwidth provisioning.

Figure 2:
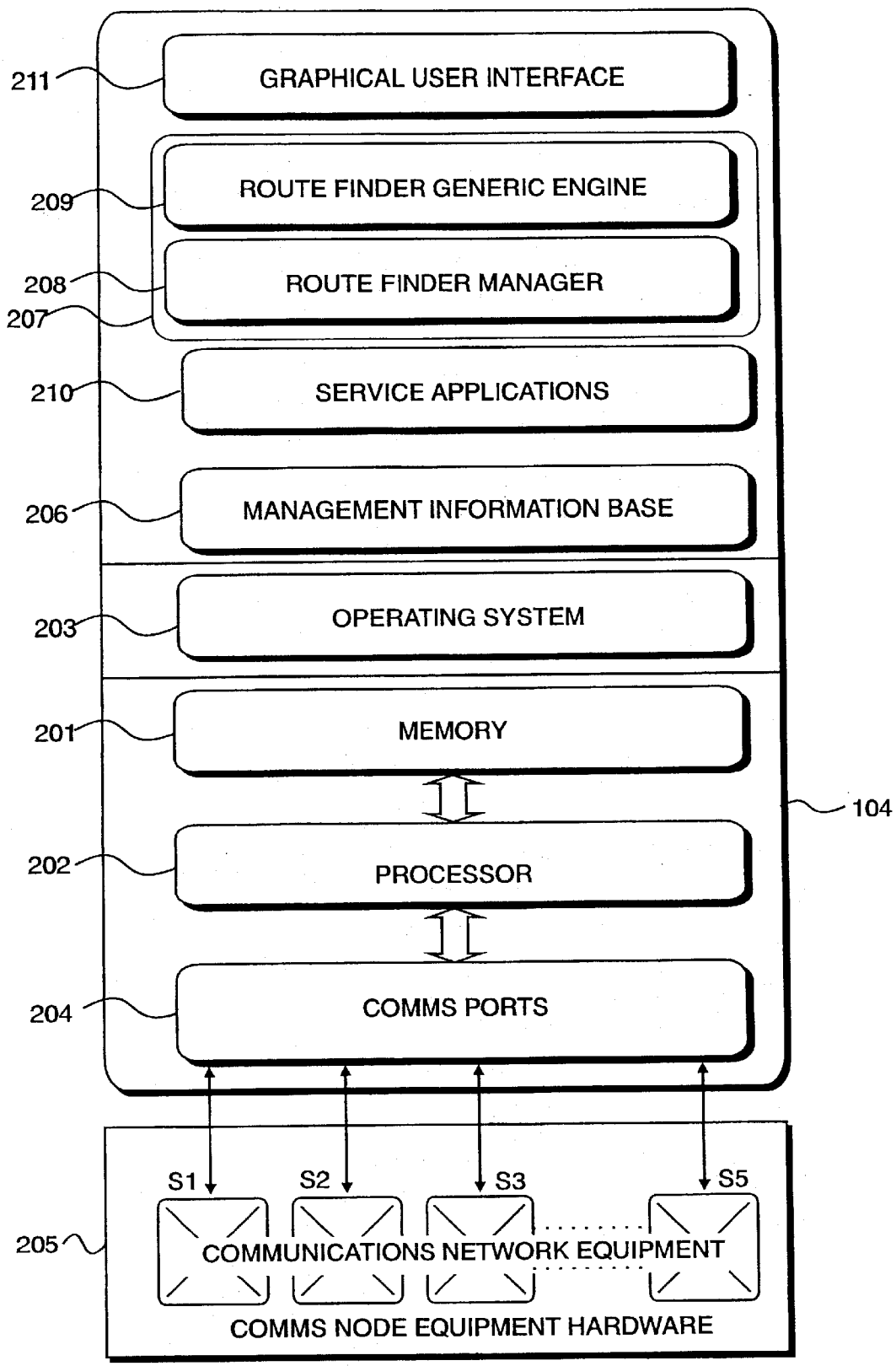
FIG. 2 illustrates schematically an architecture of the network controller identified in FIG. 1 including a route finder component.

FIG. 2 of the accompanying drawings illustrates a schematic diagram of one embodiment of a network controller 104. The network controller comprises a general purpose computer, such as a Hewlett Packard 9000 series work station, comprising a memory 201; a processor 202; an operating system 203; a plurality of communications ports 204 through which data is transferred to and from communications node equipment hardware 205; a management information base (MIB) 206 holding data describing physical resources of a network, eg node equipment type, link bitrate capacity; route finder component 207 for routing service requests across the network, the route finder component comprising a route finder manager 208 and a route finder engine 209, the route finder manager comprising one or a plurality of pre-processing components for pre-processing data prior to input to the route finder engine 209, and one or a plurality or post-processors for processing data after output from the route finder engine; a plurality of network management applications 210 for managing services over the networks, and a graphical user interface 211 for enabling an operator to monitor operation of the route finder component and to input data to the network controller.

Differences exist between different telecommunications systems. Different types of communications network, for example Asynchronous Transfer Mode (ATM) or Synchronous Digital Hierarchy (SDH) networks, have different technical properties but at a simple level each can be represented as a graph of nodes and links. According to the best mode herein, such differences may be resolved to enable use of a generic routing module suitable for a range of telecommunications systems by:

explicitly catering for instances within a generic route finding means and invoking specified routing strategies via the use of parameters providing a "mapping" to and from a generic routing model to a specific network system's requirements, constraints and limitations.

The route finder component 207 may not provide a real time routing mechanism, but operates to develop and optimize routing strategies across the network in response to a plurality of service requests generated by the other network service applications 210. The routing strategies produced by the route finder component 207 are used to produce routing tables for use by conventional real time routing applications within the network.

An overview of a generic routing problem which is addressed by the route finder component is now illustrated with reference to FIG. 3 herein which illustrates an example of a generic representation of a communications network, eg as illustrated in FIG. 1. The generic network representation is viewed as a topology graph comprising a plurality of nodes 301 connected by a plurality of links 302. Any node element equipment 101 can be represented by a node 301. Any link equipment 102 can be represented by a link 302 between two nodes. The links can be uni-directional or bi-directional, depending on whether messages can be transmitted across the link in one or two directions respectively at any given time. Each node and link has a pre-determined finite bitrate transmission capacity.

Network service applications running on the network controller or other workstations connected to the network may make a number of service requests which need to be implemented as connections between particular nodes. A service request can give rise to one or a plurality of connection requests. Each connection request results in requests for source to destination connections which must be routed across the network, in order to carry data traffic comprising the requested service. The service requests may specify the type of data traffic to be transferred, eg data or voice, a source node and one or more destination nodes.

In this specification the term "connection" means a circuit switched allocation of physical resources between a source node and one or more destination nodes.

The term "point to multipoint connection" means a circuit switched connection between a source node and a plurality of destination nodes, and the term "point to multipoint" is to be construed accordingly.

The term "multipoint to multipoint" connection means a circuit switched connection between a plurality of source nodes and a plurality of destination nodes, and the term "multipoint to multipoint" shall be construed accordingly.

In this specification, a "route" comprises a path across one or a plurality of links, between a source node and at least one destination node. A route may comprise a collection of links used for multipoint connection requests (a "tree"). A path comprises a collection of links from a single source node to a single destination node. A tree comprises a connection of links between multiple sources and/or multiple destinations. A "route" can be either a path or a tree, depending upon the connection request. In either case, the route comprises a collection of links. There may be several routes available between a source node and a destination node or set of destination nodes. A single connection may take one or a plurality of routes.

In a preferred embodiment service requests are received by the route finder component 207 which can assign routes to requested connections according to specific criteria such as avoiding overloading any specified link or node or attempting to utilize as many nodes/links in the network as possible at a given time. Each link is assigned an associated cost, denoted by numerals C1–C12 near the center of the link lines 302 in the general topology view of FIG. 3. Assignment of costs to links for a network is user specifiable. All costs can be uniform through the network or complex costs can be attached to links, for example relating to link utilization by connections. The costs can also be variable for different traffic types, for example resulting from voice or data connections. The route finder component operates to find routes having the minimum overall costs for connections to be routed between nodes in the network and thereby find routes which for example experience lower delay, or have faster, more reliable transmission.

Figure 4:
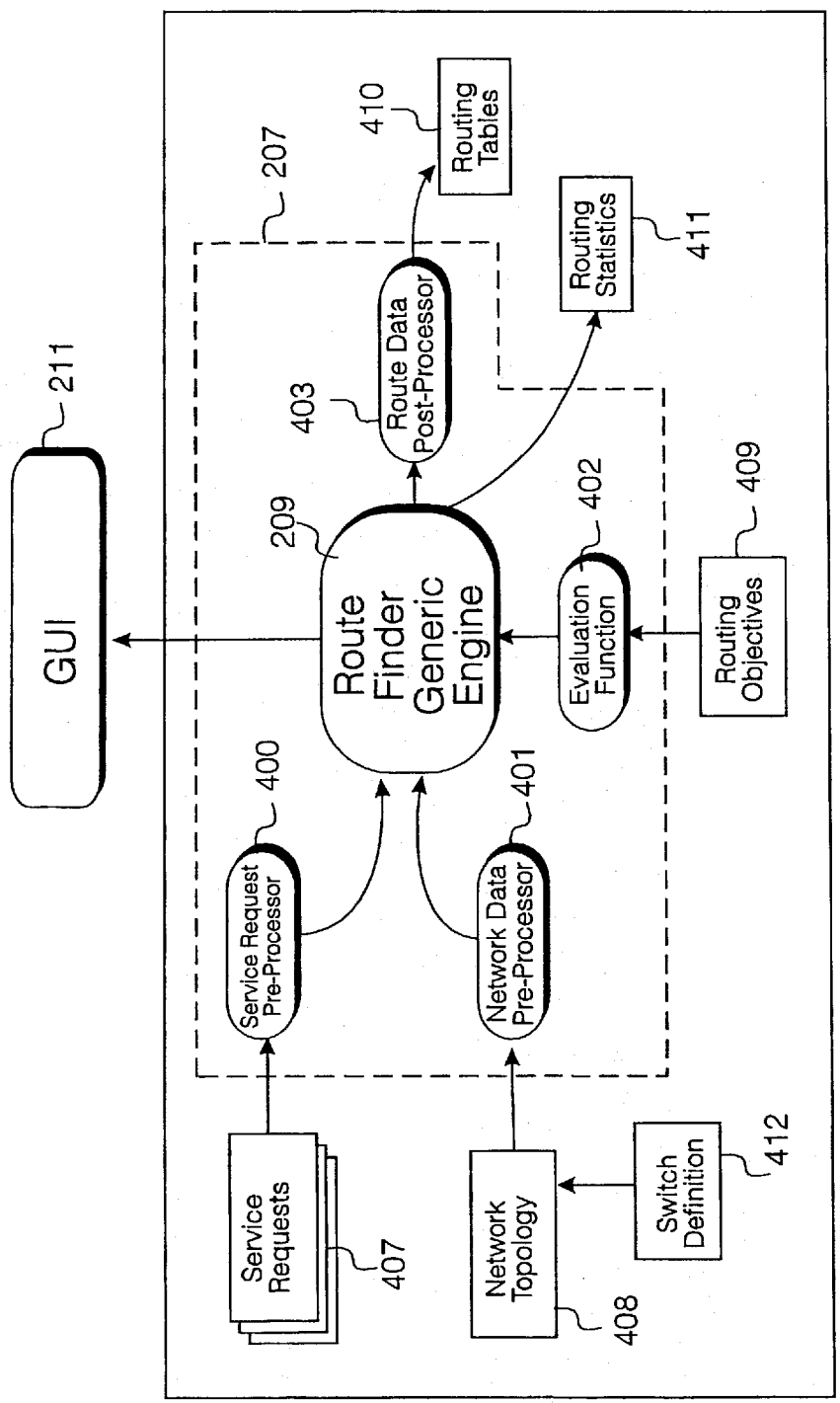
FIG. 4 illustrates an architecture of the route finder component identified in FIG. 3, including a service request pre-processor, a network data pre-processor, a route finder engine, an evaluation function processor, a graphical user interface, a route data post processor, and data inputs and outputs associated with the route finder component.

FIG. 4 of the accompanying drawings illustrates a schematic diagram of a high level architecture of the route finder component 207 and associated input and output data operated on by the route finder component. The route finder engine 209 preferably comprises a memory, and a processor executing one or more route finding algorithms. The route finder manager 208 comprises a service request pre-processor 400; a network data pre-processor 401; an evaluation function processor 402; and a route data post-processor 303. Each of the service request pre-processor, network data pre-processor, evaluation function processor and route data post-processor may comprise a processor element and an area of data storage device configured by means of algorithms for carrying out data traffic pre-processing, network data pre-processing, evaluation functions and route data post-processing respectively.

External network management applications including service management applications send service requests to the route finder manager 208 and the route finder manager responds by returning a routing strategy for implementing those services. The routing strategy is produced in the form of routing table data 410 describing a plurality of routes assigned to a plurality of connections. The route finder engine 209 receives input data from service request pre-processor 400, network data pre-processor 401 and evaluation function processor 402, and outputs data to route data post-processor 403. The pre-processors 400, 401 and 402 are configured to convert data from external management applications into a generic form suitable for input into route finder engine 209. The route finder engine can also transfer data to and from a graphical user interface (GUI) 211 allowing an operator to obtain a visual display view of connections and routes taken by connections which are assigned or to be assigned by the route finder engine 209.

The service request pre-processor and network data pre-processor input service request data, network topology data and switch definition data in an implementation specific format and convert this data into a format which is generic and not specific to any proprietary equipment types or transport protocols. The route finder engine 209 operates on the generic data produced by the pre-processors to produce generic output data, which is operated on by route data post-processor 403 prior to storing on the MIB.

The service request pre-processor, network data pre-processor and route data post-processor are implemented as product specific components, that is to say, are configured to a type of node equipment, eg switch, MIB etc which is proprietary, and may be customized in each installation. However, the route finder engine 401 and evaluation processor 404 are generic and reusable from installation to installation.

The service requests 407, network topology data 408, switch definition data 412, routing objective data 409, routing tables 410 and routing statistics 411 may be stored on management information base 206 and are accessible to a plurality of other network management applications resident on the network controller, or elsewhere on the network. Data stored on the management information base may be specific to particular proprietary network elements, and may be specific to particular transport mechanisms, eg ATM, SDH, SONET.

Service request pre-processor 400 receives input service request data in the from of a list of service requests 407 from an external application. Typically, a service request may specify:

a traffic data type, eg voice, video, computer generated data
 a source node and one or a plurality of destination nodes to be connected a required bitrate capacity (either peak or average) between the source nodes and each destination node acceptable cell loss and delay thresholds a time and duration when transmission of the traffic data is required.

a number of routes and a splitting of traffic data between those routes

The service request pre-processor 400 converts the service requests 407 into a generic data format suitable for input to the route finder engine 209. The input service request data 407 may be specific to individual switch types, or transport protocol types. Service request pre-processor 400 converts the service request data to produce a traffic matrix data for each traffic type. These matrices are transformed into generic service requests by service request pre-processor 400, which are input into route finder component 207 to be routed across the network.

The network data pre-processor 401 receives input data describing the network 408 from Management Information Base 206. The network data describes connectivity and topology of nodes and links of the network. The network data may contain switch definition data 412 which describes network node elements' characteristics such as bandwidth capacity. The network topology data may include:

node names, their birate capacities (peak or average) and their cell processing times link names, their bitrate capacities (peak or average) and costs for each traffic type to be routed link status data describing an amount of bitrate capacity already consumed by existing service requests node status data describing an amount of bitrate capacity already consumed by existing service requests The network data pre-processor 403 converts the input network data into a generic form suitable for the route finder component 207. Network data pre-processor 403 receives the network data 408 including switch definition data 412, which may be in a form specific to individual proprietary switches and link equipment, and generates generic network graph data which is input into route finder generic engine 209. Since the network data 408 includes switch specific information, such switch specific information is converted to generic format by network data pre-processor 401. An example of a switch specific information is a bitrate capacity of a switch.

Evaluation function processor 402 receives a representation of routing objectives data 409 entered by a user. The evaluation function processor 402 is used by the route finder engine's genetic algorithms to quantify efficiency/fitness of a particular set of routes found for the service requests it receives. Evaluation function pre-processor 402 receives routing objective data 409 describing high level routing objectives specified by a network operator. Such high level routing objectives may comprise data describing constraints on routing. The evaluation function pre-processor 402 assigns a fitness data to potential routing strategies specified in the routing objective data 409. The assigned fitnesses are used by the route finder engine in searching for potential routes across the network.

The route finder engine 209 produces route data describing a list of routes for the service requests. The output route data is transferred to route data post-processor 403 which converts the route data into a routing table 410. The route finder engine 209 produces route data in generic format for each node in the network. The route data post processor 403 converts the generic format route data into a product specific routing table form usable by the network switches. The routing table data is accessible by a connection control component of the node equipment switches for implementing the connections. The route finder engine 209 also outputs routing statistics data 411. A user can view and evaluate the routes found by the route finding component by inspection of the routing statistics data 411 stored on the MIB 206.

Routing statistics data 411 may include data describing utilization of the network, both in terms of utilization of links, switches and overall utilization after satisfaction of service requests differences in a state of the network from a state under previous routing strategies distribution of traffic across computed routes The route finder engine 209 is configured to operate on generic network data produced by the service request pre-processor 400, network data pre-processor 401, and evaluation function processor 402. The route finder engine 209 operates according to an algorithm which performs an artificial intelligence search technique. In the best mode herein, the route finder engine operates a genetic algorithm, although as an alternative, a simulated annealing algorithm, or a combination of a genetic algorithm and a simulated annealing algorithm may be applied by the search engine. In the best mode described herein, a genetic algorithm implementation is described, using the known GAmeter tool kit ("The GAmeter Tool Kit" J Mann, A Kapsalis, and G D Smith; in Applications in Modem Heuristic Techniques, V J Rayward-Smith (Editor) Chapter 12 pp 195–209, Alfred Waller 1995).

By structuring the route finder component 207 into the manager component 208 and generic route finder engine 209, the search algorithms of the route finder engine component can operate without using any problem specific knowledge. The search algorithm optimizes its search for routes according to fitness data produced by evaluation function processor 402. By separating the search engine from the evaluation criteria produced by evaluation function processor 402, modularization and generality may be achieved, thereby allowing improvements to be made to the search algorithm independently of service request pre-processor processor 400, network data pre-processor 403, or evaluation function processor 402.

Figure 5:
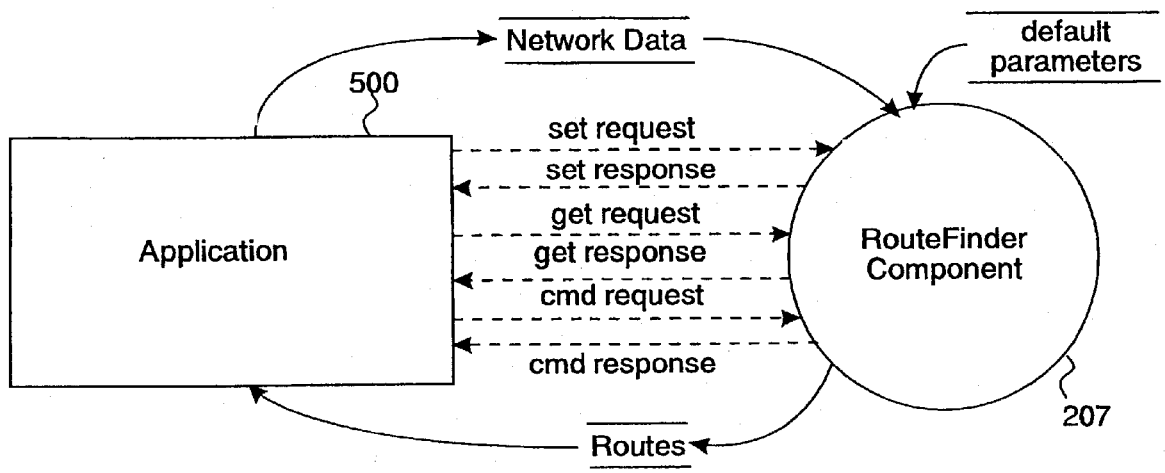
FIG. 5 illustrates schematically interaction of the route finder engine with a network management application.

FIG. 5 herein illustrates schematically route finder component 207 and examples of interactions with a network management application 500. The network management application 500 communicates with the route finder component 207 by a series of set, get and command signals (set request, set response, get request, get response, command request, command response) as illustrated in FIG. 5. Network data is passed from the management application to the route finder component, enabling the route finder component to gain knowledge of the network across which the network management application requests to deploy a service. The route finder component 207 finds an optimized set of routes for carrying the service, and returns data describing those routes to the management application 500 in the form of routing table data 410. The route finder component 207 determines the optimum routes in accordance with a set of default parameters. The default parameters are stored in the route finder component 207 and the management application 500 or a user may update, query or change the default parameters by means of the command request signals.

In the following description, a genetic algorithm implementation of route finder component 207 will be described. It will be understood that in other embodiments of the invention, the genetic algorithm search engine may be replaced by other artificial intelligence technique search engines, for example a simulated annealing search engine, or a combination of a genetic algorithm search engine and a simulated annealing search engine.

Figure 6:
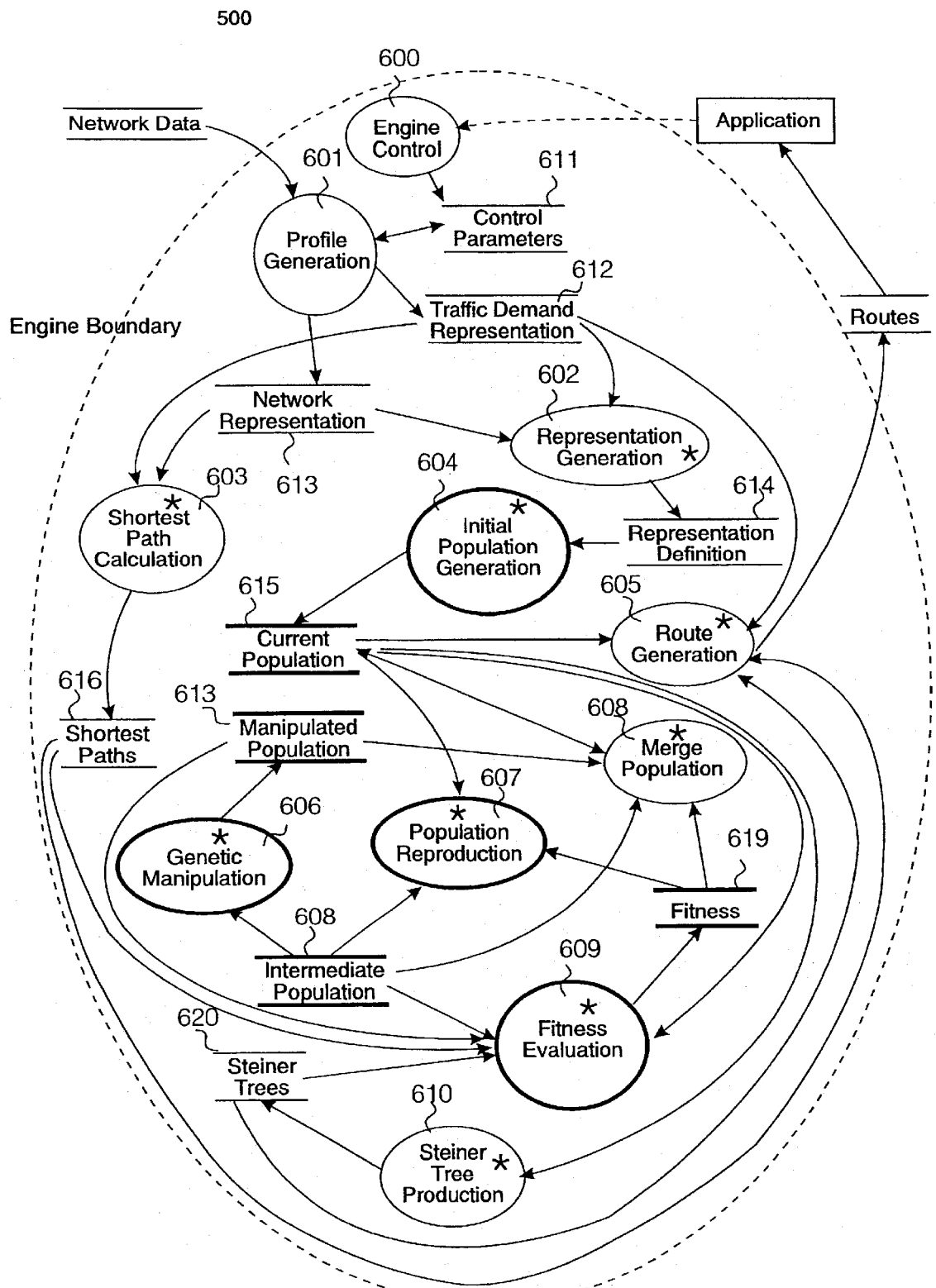
FIG. 6 illustrates a data flow diagram showing schematically flows of data and data processing operations within the route finder engine.

Referring to FIG. 6 herein, there is illustrated a data flow diagram of data within route finder component 207. The route finder component 207 comprises a plurality of data processing elements, each comprising a processor and an associated area of memory device carrying out specific processes as illustrated schematically in FIG. 6. Data is transferred between processors as indicated in FIG. 6 herein. The symbol * associated with several of the processes in FIG. 6 indicates that there is a data flow from control parameters data 612 to shortest path calculation process 603, initial population generation process 604, route generation process 605, genetic manipulation process 606, population reproduction process 607, merge population process 608, fitness evaluation process 402, and Steiner Tree production process 610. The functions of each of the process are as follows. Engine control processor 600 controls invocation of all other processes within the route finder generic engine 209. Profile generation process 601 reads a data file containing data describing network topology and traffic demand information and processes it into an internal representation of the network and of traffic demands, both point to point and point to multipoint, placed upon the network by an application. A network data file output from network data pre-processor 401 is input into profile generator process 601. Control parameter data 611 describing parameters such as form example weighting co-efficients associated with a fitness evaluation process 609 carried out by evaluation function processor 402 is also input into profile generation process 601. Representation generation process 602 operates on traffic demand representation data 612, network representation data 613 output from profile generation process 601 and selected control parameter data 611 to compute a number of bits which are required by the genetic algorithm to represent a routing decision space, from which generic routing solutions will be found.

Network representation data 613 stores two "views" of the network. Firstly, a graph view of the network on which algorithms, eg k shortest path algorithm or minimum spanning tree algorithms can be run is stored in the network representation data 613. Secondly, a view of the network which allows a mapping to external node and link names is stored. This view is generated during network data parsing, and is used principally during production of routes. The information stored for the network representation data 613 includes:

locations
links
link costs
graphs

Locations have the attributes:
geographical position
name
capacity, ie the amount of traffic which can flow through a node Links have the following attributes:
link identifier
source node and port number
destination node and port number
current load, ie a load before traffic requests are routed
total load, ie a load after traffic requests are routed Link costs have the attributes:
ink identifier
routing cost Link cost information is stored for all traffic types in the traffic demands which require routing.

Graphs have the following attributes:
number of nodes
degree of each vertex

Shortest path calculation process 603 operates a known Yen-Lawler algorithm on the network representation data 613 and traffic demand representation data 612 and outputs the shortest path data 616 comprising an integer number k shortest paths for each service request 407 input to the route finder component 207. A genetic algorithm search routine is implemented by initial population generation processor 604, genetic manipulation processor 606, population reproduction processor 607, merge population processor 608, and fitness evaluation processor 609. In general, genetic algorithm processes are well known in the prior art and involve representing a problem as a series of bits or bytes of data in fixed length bit strings. Populations of fixed length bit strings are altered, combined, mutated and crossed over with each other and optimized bit strings are selected in accordance with a fitness criteria. In the best mode herein, routes across a network of nodes and links are represented by bit strings of ones and zeros, which are mutated and combined to find optimum routes in accordance with routing objectives 409 input into a fitness evaluation function operated by evaluation function processor 402. Initial population generation processor 604 operating part of the genetic algorithm, computes a size of a routing decision space from which routes are to be found and produces an initial population of string data representing routes across the network. By size of a decision space, it is meant a number of possible different routes (each represented by a corresponding respective string). The strings in the initial population describe randomly assigned routes across the network. Optionally, an initial string population in which all shortest paths across the network have been assigned may be generated. In generating the initial population of strings, initial population generation process 604 inputs representation definition data 614 generated by representation generation process 602, and operates in accordance with various control parameters specified in the control parameter data 611. A current population of strings represented by current population data 615 is input into population reproduction process 607. Population reproduction process 607 takes the current population and reproduces the population of strings based upon the values of several control parameters specified in control parameter data 611, and in proportion to a "fitness" of the individual strings of the population of strings, to produce an intermediate population of strings represented by intermediate population data 618. The fitness criteria are specified in fitness data 619, which are input into population reproduction process 607. Genetic manipulation process 606 inputs the intermediate population data comprising an intermediate population of strings, applies known mutation and cross over process and thereby generates a manipulated population of strings. This process mixes the strings contained in the intermediate population. The current population, intermediate population and manipulated population are merged by merge population process 608, according to parameters specified in control parameter data 611 and according to fitness values of each member of the population as determined by fitness evaluation process 609 outputting fitness data 619. The fitness evaluation process 609 inputs data strings comprising population members from the current, intermediate and manipulated population data, decodes them through the use of shortest path and Steiner Tree information, and simulates routing of traffic using the network representation data based on the current, intermediate and manipulated population members. A fitness function is evaluated according to control parameters specified in control parameter data 611 as will be described hereinafter. A fitness value for each population member is generated. Steiner Tree production processor 610 inputs bit strings representing routes comprising a current population represented as current population data 615 and computes Steiner Trees for each individual string. This process decodes the individual bit strings comprising population members, which indicate which of the graph nodes are to be included in the Steiner Tree. Prim's algorithm is used in order to compute a minimum spanning tree for the graph nodes included in the Steiner tree for each string population member. A known spanning tree comprises a subgraph of a connected graph. This subgraph is a tree and involves all the nodes of the graph. A minimum spanning tree is a weighted spanning tree formed from a weighted graph such that the real numbers assigned to each edge when summed total not greater than the corresponding sum for any other spanning tree defined for the subgraph. Route generation process 605 periodically, selects optimum population member strings from the current population, with a period which may be specified by user in control parameter data 611, and decodes the strings into routing information for point to point and point to multipoint service requests. This information is printed as text information and is available to a user via graphical user interface 211.

There will now be described further detail of how the route finder component 207 is controlled by an external network management application 500. As described with reference to FIG. 5, an external network management application sends commands to the route finder component 207 such as get, set, execute or command, and arguments of these commands control execution of the route finder component 207. The get and set commands allow general interaction with control parameter data 611 under control of engine control process 600. The Command instruction causes the search engine to begin a search for optimal routes. The genetic algorithm search engine interacts with the representation generation process 602 and shortest path calculation process 603 in order to compute the size of string representation required (in bits) and compute paths for each point to point traffic demand from which routes will be chosen.

The representation generation process and shortest path calculation processor are pre-processor steps in the route selection process. Each time the management application 500 requests a set of new routing solutions, the representation generation process and shortest path calculation process are operated in an initialization phase prior to operation of the search for routes.

For each search carried out by the genetic algorithm search engine, following the initialization phase, a cycle of processes is involved. The following example refers to the genetic algorithm implementation presented as the best mode herein. A current population of data strings generated by initial population generation process 604 is input as current population data 615 into fitness evaluation process 609. Fitness evaluation process 609 generates fitness data 619 corresponding to the current population of strings. The fitness data and current population data is used by the population reproduction process to generate an intermediate population of strings output as intermediate population data 618. Each string of the intermediate population has its fitness evaluated by fitness evaluation process 609 resulting in fitness data 619 describing a fitness value for each string comprising the intermediate population of strings. The manipulated population of strings represented by manipulated population data 617 has its fitness evaluated by fitness evaluation process 609 resulting in fitness data 619 representing a fitness of each string of the manipulated population. Data describing the three populations of strings, ie the current population, intermediate population and manipulated population, along with fitness value data corresponding to each string of the current, intermediate and manipulated populations are input to the merge population process 608 which generates a new current population of strings represented by current population data 615 based upon selection of fittest strings from each of the current, intermediate and manipulated populations. The cycle completes by route generation process 605 computing a plurality of routes based upon one or more fittest strings of the current population, and returning these computed routes to network management application 500 as routing tables 400, after first converting the output route data to a form suitable for input to the management application 500 in route data post-processor 403. Generation of new routes is conditional upon control parameters stored in control parameter data 611, specified by network management application 500. The generation of new route data terminates when population reproduction processor 607 determines that a predetermined number of evaluations specified in the control parameters data 611 have been performed. The route finder component 207 then waits for further commands from the network management application 500 before generating further route table data.

In the above process, fitness evaluation process 609 uses shortest path data and Steiner Tree data to accord a fitness parameter to the string members of the populations. Whilst shortest path information is generated only once in response to a request for routing from the network management application 500, Steiner Tree data is generated for each member of each population. Thus, Steiner Tree production is invoked for a point to multipoint service request.

Referring again to FIG. 4 herein, interfacing between the service request pre-processor 400, network data pre-processor 401, evaluation function pre-processor 402, route data post-processor 403 and route finder engine 209 is made by way of reading and writing data from a plurality of results data files, which are written in simple ASCII protocol.

Figure 7:
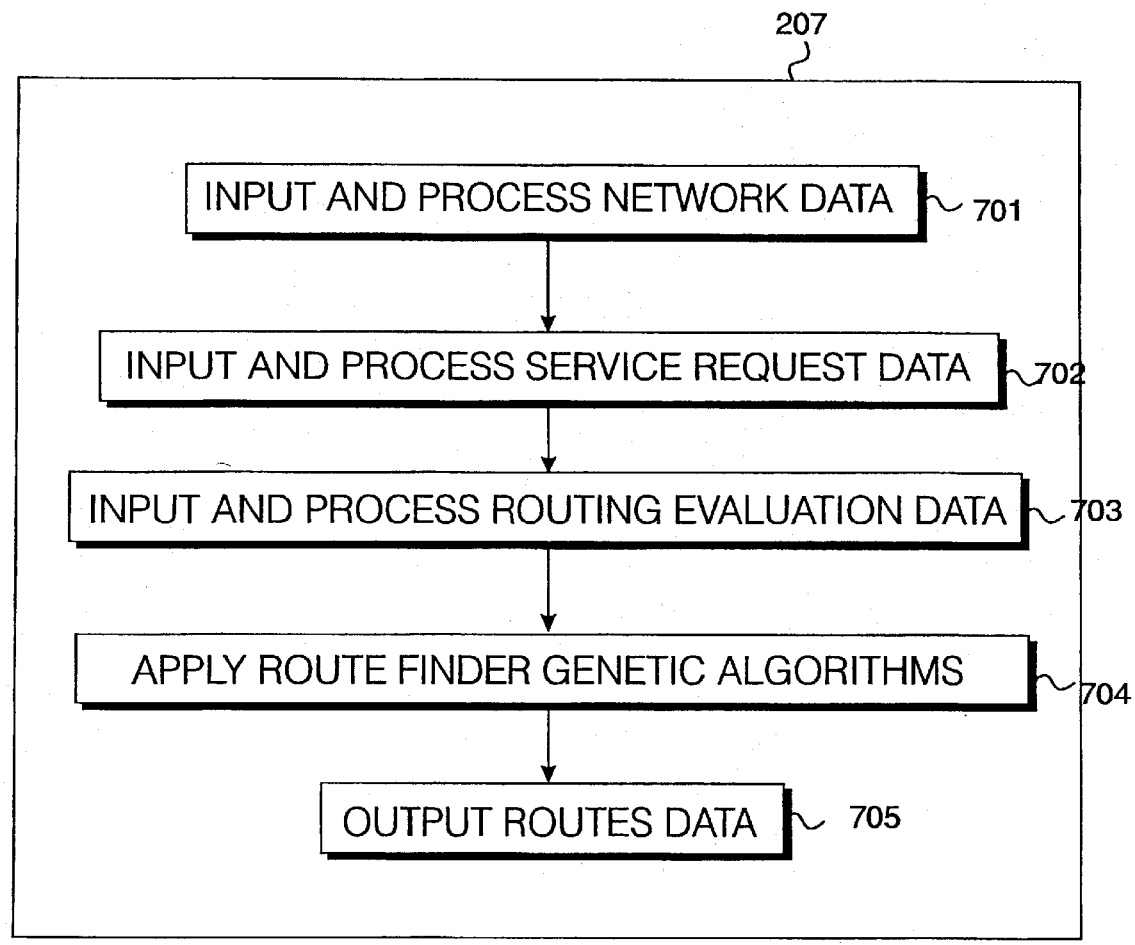
FIG. 7 illustrates schematically steps executed by the route finder component identified in FIG. 3.

FIG. 7 herein illustrates steps executed by the route finder component 207. At step 701 data describing service requests 407 is entered into service request pre-processor 400 which produces a Simple ASCII Protocol (SAP) file describing the service requests which is entered into the route finder engine 209. At step 702 network topology data 408 is entered into network data preprocessor 401 which outputs a SAP file describing relationships between nodes and links in the network. The SAP file is entered into the route finder engine 209. At step 703 a SAP text file containing data representing routing objectives 409 input by a user is entered into the route finder engine 209. At step 704 the route finder engine 209 preferably uses genetic algorithms to route the service requests it receives as input on the network described in its input according to the entered routing objective data 409 evaluation function. At step 705 the route finder engine 209 outputs a SAP file containing a list of routes for the connection requests. The SAP file may be entered into the route data post-processor 405 at step 705 in order to convert the route data SAP file into a form suitable for use by the external application which made the service requests.

A set of routing strategies carried out by route finder component 207 will now be described. To aid understanding the operations are described as operations on single node and link network graph representations as shown schematically FIGS. 8 and 9 herein. It will be understood that the graphs shown and the routes selected are implemented as machine executable data processing operations on data representing nodes and links of a network.

Figure 3:
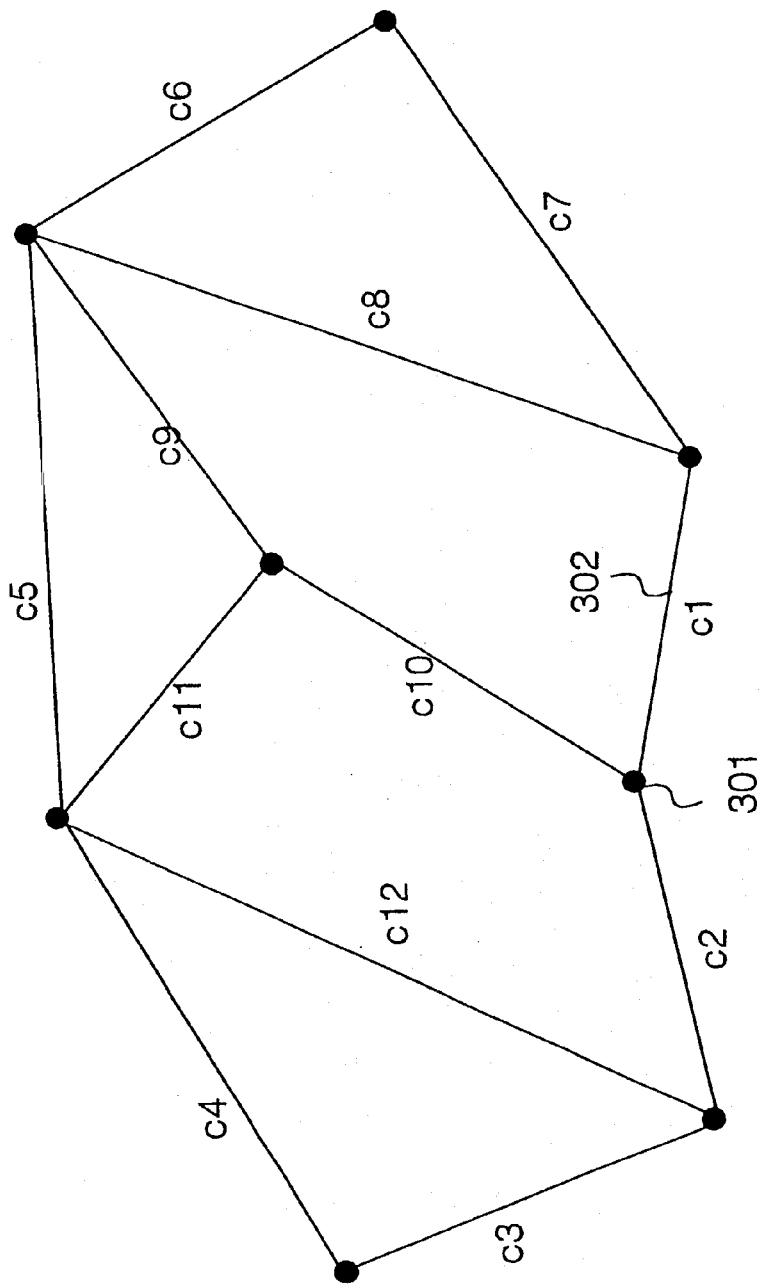
FIG. 3 illustrates schematically a generic representation of a topology of the network shown in FIG. 1, reduced to a plurality of nodes and links.
Figure 8:
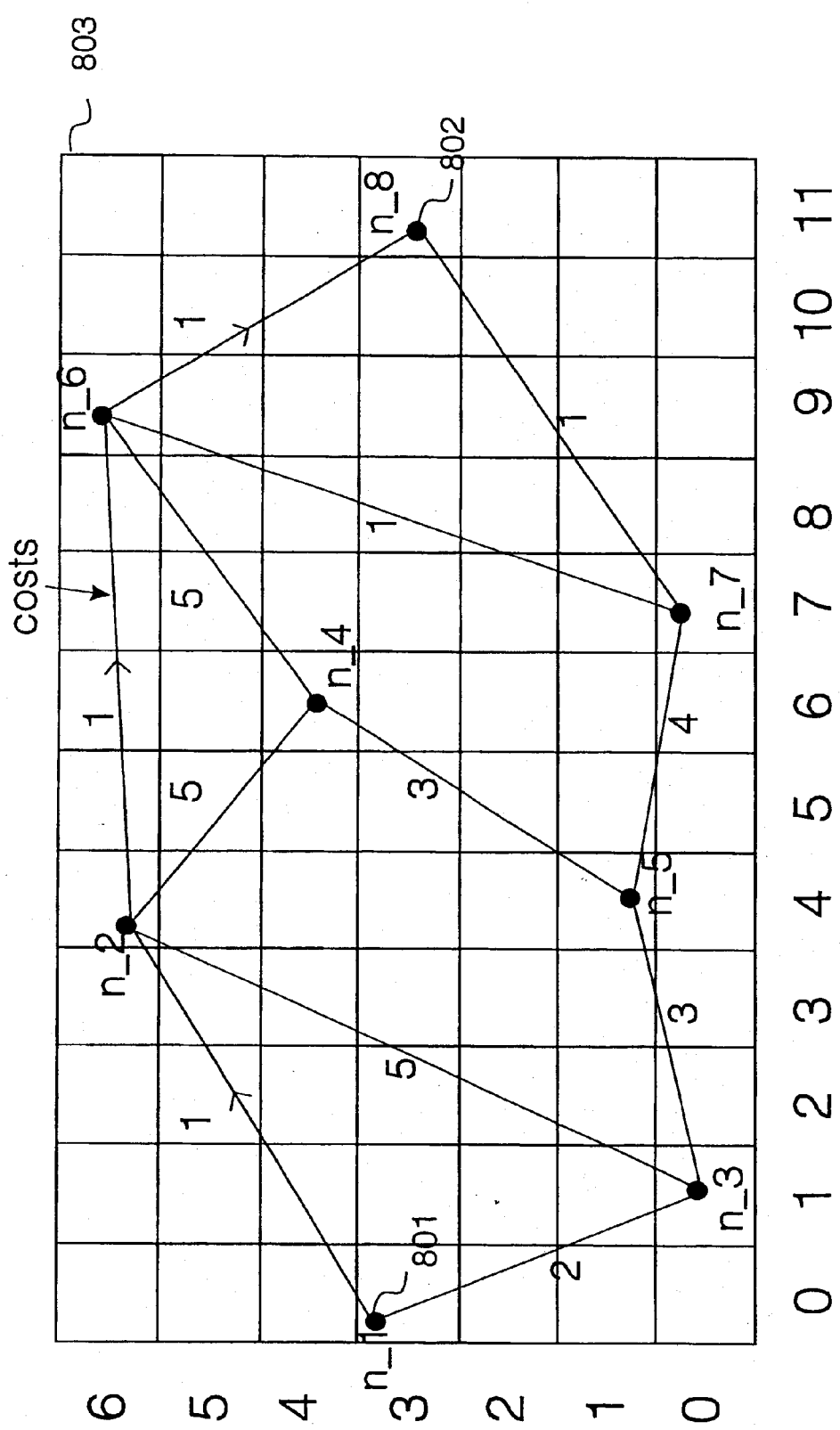
FIG. 8 illustrates the generic representation of a network identified in FIG. 3 combined with elements used by the route finder.

FIG. 8 of the accompanying drawings illustrates the generic network graph of nodes and links illustrated in FIG. 3. A grid of coordinates 803 is superimposed upon the network graph, such that each node is assigned a unique XY coordinate position. Links between nodes are assigned associated costs, (denoted in FIG. 8 by numerals near the center of the link lines). An example of a route chosen by the route finder for a connection between a source node 801, labeled n_1 and a destination node 802 labeled n_8 is indicated by links having directional arrows. Configured for shortest path routing, the route finder preferably finds minimum cost routes for a plurality of connections between such pairs of source and destination nodes in the network.

Alternatively, the route finder may be configured to "balance" connections across the network. Balancing the connections may be achieved by taking into account an integer number K shortest paths between the source and destination node of each connection, and selecting the shortest path for each connection which yields an even distribution of network node and link utilizations.

Referring again to FIG. 8 herein illustrates a generic network graph of nodes and links illustrating how balancing of traffic across the network is achieved. Whereas a shortest path routing would force traffic between source 801 node n_1 and destination 802 node n_7 and traffic between source S node n_1 and second destination node n_8 through nodes n_2 and n_6, placing congestion on nodes n_2 and n_6, by considering an integer number k shortest paths, traffic from source n_1 to first destination n_7 may be routed through alternative nodes n_3 and n_5, whilst traffic between source n_1 and second destination n_8 may continue to be routed through nodes n_2 and n_6, thereby balancing traffic across different routes of the network and achieving more uniform loading of nodes and links with traffic data.

The route finder component 207 may route a single connection over several different routes. This "splitting" of connection over routes may be necessary where the connection requires a high bandwidth capacity. The number of routes over which such a connection request may be split can be entered by a user, or the route finder itself may decide the number of routes over which to split the connection request up to a user defined upper bound. The percentage of bandwidth capacity of a connection request to be divided across the number of selected routes can also be chosen by the user. For example, if the connection request's bandwidth capacity is to be divided across a first and a second route then 30% of the connection requests bandwidth capacity can be carried across the first route and 70% of the connection request's bandwidth capacity can be carried by the second route.

A single connection may be distributed across multiple paths across the network. Traffic between source node n_1 and destination node n_7 in response to a service request may be carried over an integer number o f multiple paths. For example, a first route may traverse nodes n_2 and n_6, carrying 70% of the data of the service. A remaining 30% of the data of the service may be routed via nodes n_3 and n_5. The distribution of routes may be user specified, or alternatively optimized by genetic algorithms. A default condition whereby a single route carries all traffic relating to a source-destination service request may be set by a user.

Figure 9:
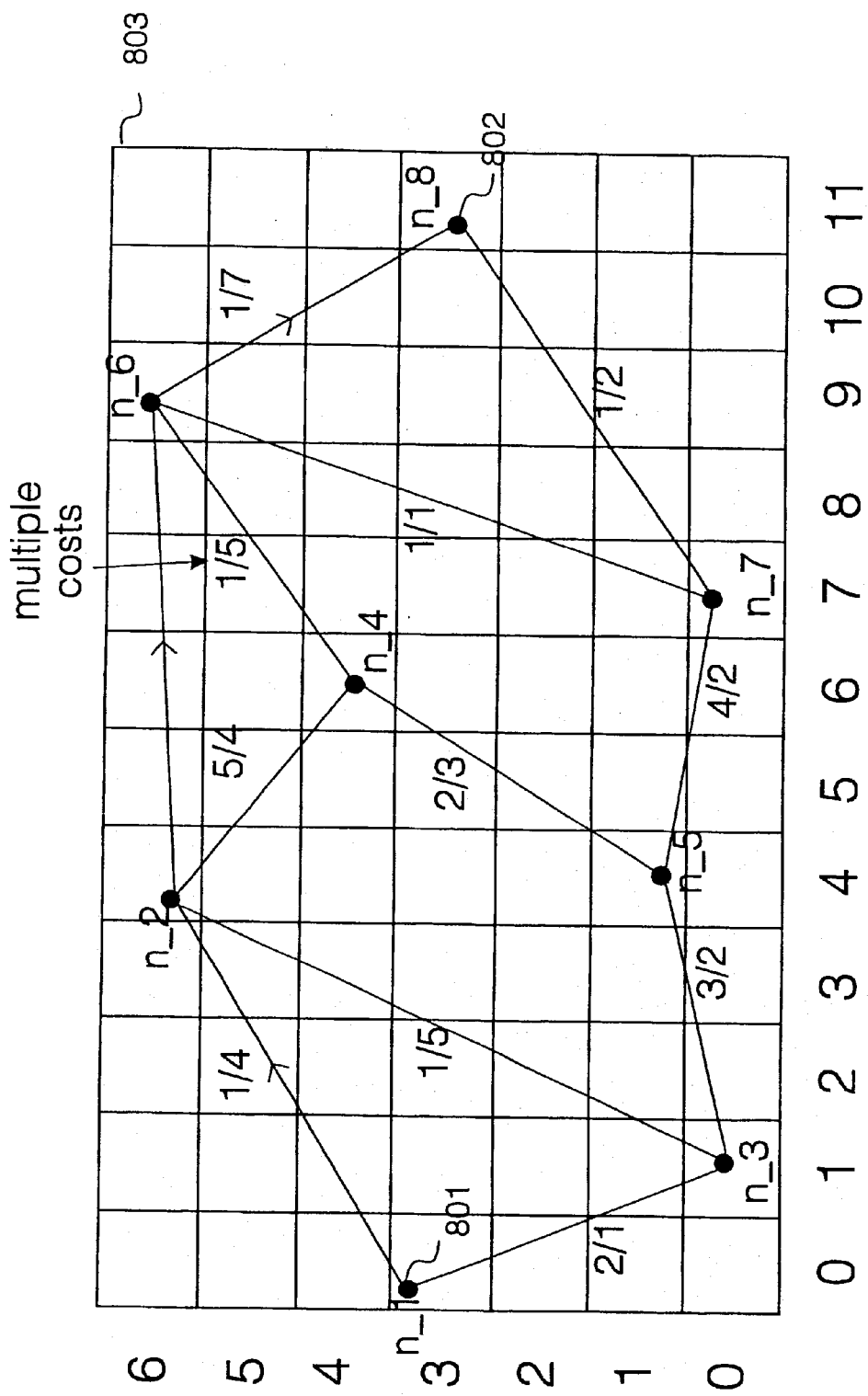
FIG. 9 illustrates the generic representation of a network identified in FIG. 3 combined with elements used by the route finder including multiple costs.

FIG. 9 of the accompanying drawings illustrates the network graph nodes and links shown in FIG. 8 but with the network links having multiple costs, denoted by numerical values separated by a slash symbol (/). The multiple costs may be associated with different traffic types, eg voice or data. The route finder any select paths for connections taking into account the traffic type used by the connection.

Point to multipoint traffic cannot be dealt with by shortest path routing. In the specific methods presented herein, the route finder component 207 may deal with point to multipoint traffic as illustrated with reference to FIG. 9 herein as follows. For traffic originating at source node n_1 and terminating at multiple destinations nodes n_8 and n_7, routes n_1, n_2, n_6, n_8 and routes n_1, n_3, n_5, n_7 may be selected, or routes n_1, n_2, n_6, n_7 and route n_1, n_2, n_6, N_7 and route n_1, n_2, n_6, n_8 may be selected. Other combinations are possible even in the simple example illustrated with reference to FIG. 9. Further, for point to point or point to multipoint services, routing may be selected according to traffic data type.

A user may interact with a route finder component 207 by use of graphical user interface 211, to edit and alter data already input from a network application or to enter data directly. Data editing and entry is achieved by manipulation of a cursor icon using a computer peripheral pointing device, eg a mouse, trackball device or similar, across a series of display screens, various ones of which are described hereunder.

Figure 10:
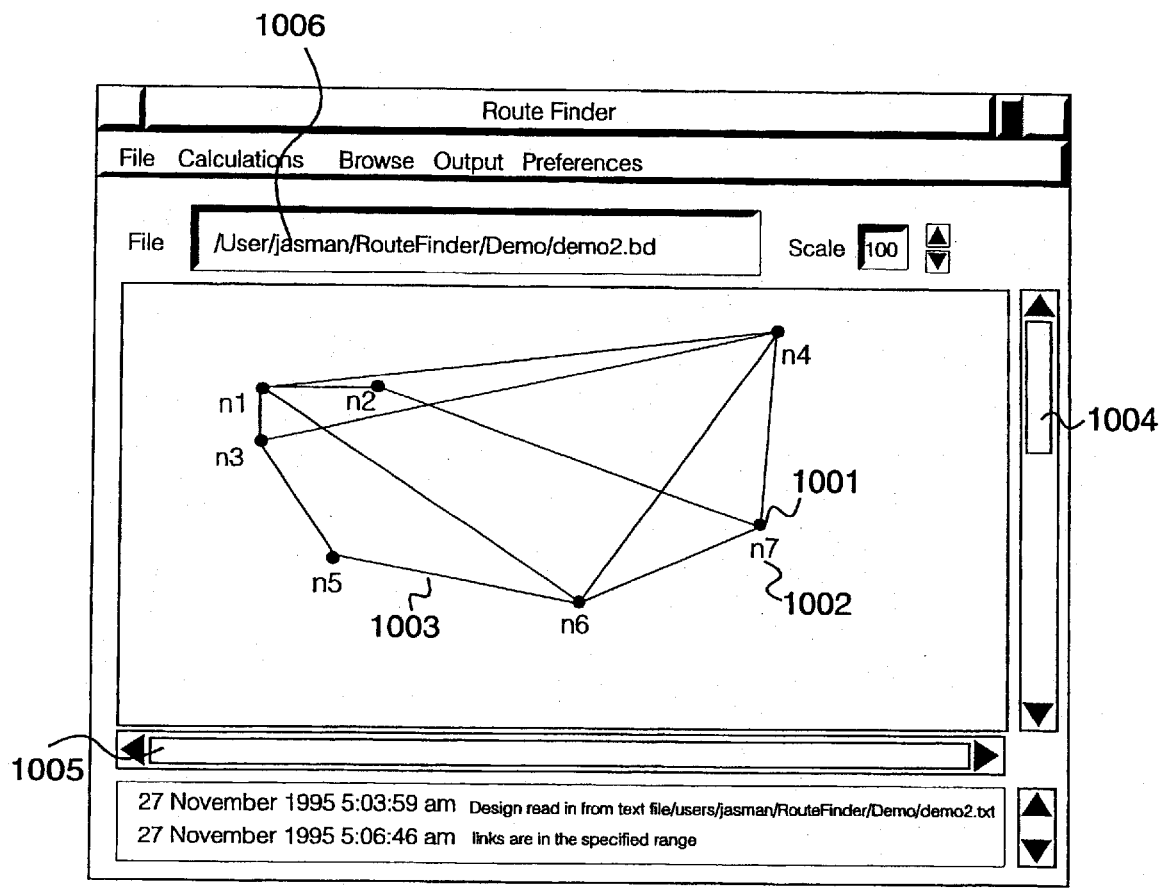
FIG. 10 illustrates diagramatically a screen display produced by the graphical user interface identified in FIG. 4 which a user may use to create or edit network data.

FIG. 10 of the accompanying drawings illustrates a network data editor screen display which a user may use to create or edit network topology data. The network data editor, which is part of the GUI 211, may be used to produce network data for the route finder engine 209 as an alternative to network data preprocessor 401 receiving network topology data 408 and converting it to an SAP file. Nodes 1001 appear on the display window of a screen as icons and given labels 1002. Links between nodes can also be drawn, represented by lines 1003. The display includes a horizontal scroll bar 1005 and a vertical scroll bar 1004 which the user may use to draw a network topology of greater area than currently shown in the display window. The network topology data drawn is saved using a file name 1006. The file saved is preferably a file conforming to the SAP format.

Figure 11:
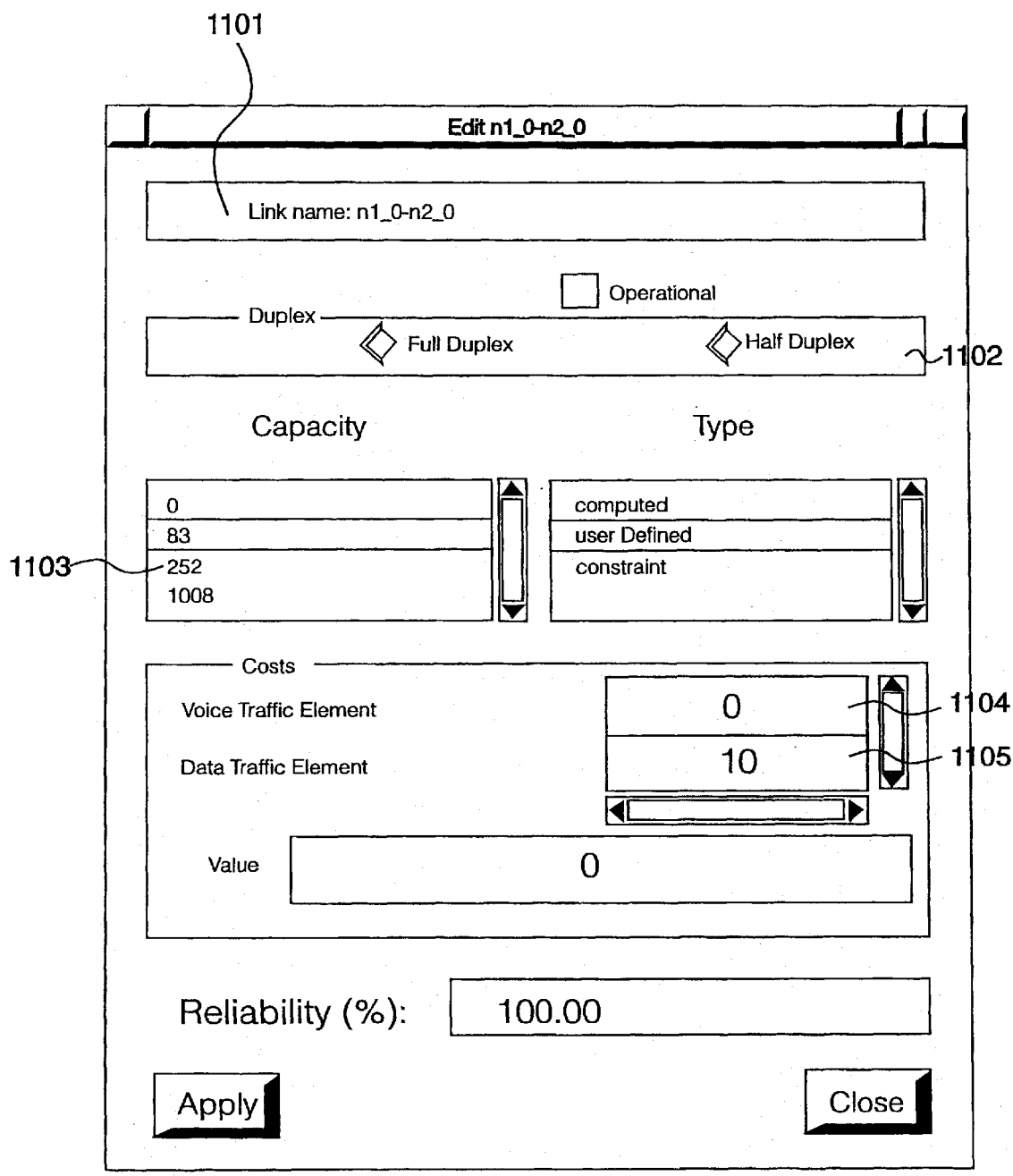
FIG. 11 illustrates diagramatically a screen display produced by the graphical user interface identified in FIG. 4 which a user may use to edit data describing network links.

FIG. 11 of the accompanying drawings illustrates a link data editor screen display which a user may use to edit data describing network links. The link data editor part of the GUI 211, may be used to produce network data for the route finder engine 209 as an alternative to network data preprocessor 401 receiving network topology data 408 and converting it to an SAP file. The screen display comprises a dialog box showing a name of a link, that is, the link's two end points (each end point having a node label and a port number). The display also comprises two icons 1102 which may be used to specify whether the link is for full duplex or half duplex (ie bi or uni directional, respectively). A bandwidth capacity of the link may also be edited by selecting a numerical value which is presented in a scroll menu display 1103. Costs associated with a link may also be entered and edited, for example a cost of voice data for the link may be edited by entering a numerical value 1104, in a cost data entry portion of the display window 1104. Likewise for data traffic 1105.

FIG. 12 of the accompanying drawings illustrates an example of a text file having SAP format which may be entered into the route finder engine from network data pre-processor 403 or resulting from the network topology data editor shown in FIG. 10 or the link data editor shown in FIG. 11. A file in SAP format may comprise a plurality of lines containing ASCII characters with each line terminated by an ASCII new line character. For the route finder's input, the SAP file comprises a plurality of sections, with each section having a header line followed by one or more data description lines.

Network nodes are described in a nodes section. A header line 1201 for a node section comprises:

[nodes]

A node description line 1202 comprises a node label which acts as an identifier for the node, XY coordinates corresponding to a coordinate grid of a node and a numerical value denoting capacity. An example node description line comprises:

n_1 {0 3 1}

This denotes a node n_1 at XY coordinates 0,3 with a capacity of 1.

A link section describing network links has a header line 1203 comprising:

[links]

A link description line 1204 defines a single link between a pair of nodes. A link description line may comprise two end points (each end point described by a node label and a number representing a node port), a value denoting the total capacity of the link and an identifier indicating whether the link is simplex or duplex (ie whether traffic on the link can be uni- or bi-directional). An example of link description comprises:

{n_1}{n_2 1}622 NetworkLinkDuplex

This denotes a link from port 1 of node n_1 having node port 1 and port 1 of node n_2, having a capacity of 622, and being a duplex unit.

Data describing an amount of capacity of a link already in use is given in a link state section. A header line 1205 for a link state section comprises:

[linkstate]

A description line describing link state capacity usage 1206 may comprise two end points and a numerical value denoting link capacity used, eg:

{n_1 1}{n_2 1}402

This example represents a link between port 1 of node n_1 and port 1 of node n_2, having 402 units of capacity already allocated. The route finder engine does not place a unit of measurement on the number of 402 units. Thus, as long as the capacity and load utilization are measured in the same units, the numerical values denoting capacity and load can both be sent to the generic route finder engine 209.

Data describing current utilization of a node's capacity is given in a node state section. A header line 1207 of a node state section comprises:

[nodestate]

A node state description line 1208 may comprise a node label (which should be already defined in a node description section, any lines containing undefined node labels will be ignored) and a value denoting current capacity utilization of the node, for example:

n_1 1

In this example, node n_1 has a present allocated capacity of 1. No unit of measurement is placed on the file by the generic route finder engine, since the route finder manager 208 sends all data to the generic route finder engine in the same units.

Data describing reliability of a link is given in a link reliability section. A header line 1209 for a link reliability section comprises:

[linkReliability]

A link reliability description line 1210 defining reliability of a single link may comprise two end points (each having a node label and a port number) and a real number having a value between 0 and 1.0 (1.0 denoting 100% link reliability), eg:

{n_1 1}{n_2 1}0.999

This example represents a link between port 1 of node n_1 and port 1 of node n_2, having a link reliability factor of 0.999.

Data describing reliability of a node is given in a node reliability section. A header line 1211 for a node reliability section comprises:

[nodeReliability]

A description line 1212 defining reliability of a single node comprises a node label and a real number having a value between 0 and 1.0 (1.0 denoting 100% node reliability):

n_1 0.995

This denotes a node n_1 having a reliability factor of 0.995.

Data describing costs associated with links is given in a costs section. A header line 1213 for a costs section comprises:

[costs]

A description line 1214 defining the cost of a single link comprises two end points (each end point having a node label and a port number) and one or more data types with a numerical value representing the cost, eg:

{n_1 2}{n_2 3}{data 1}{voice 2}

This example illustrates a link between port 2 of node n_1 and port 3 of n_2 which has a cost value of 1 for data service traffic and a value of 2 for voice service traffic. That is to say, the link has a lower cost for data traffic than for voice traffic. The measurement of cost has no unit. The cost value is used by the generic route finder engine to find shortest paths from which a final choice of paths is made and is used in the calculation of minimum spanning trees.

Figure 13:
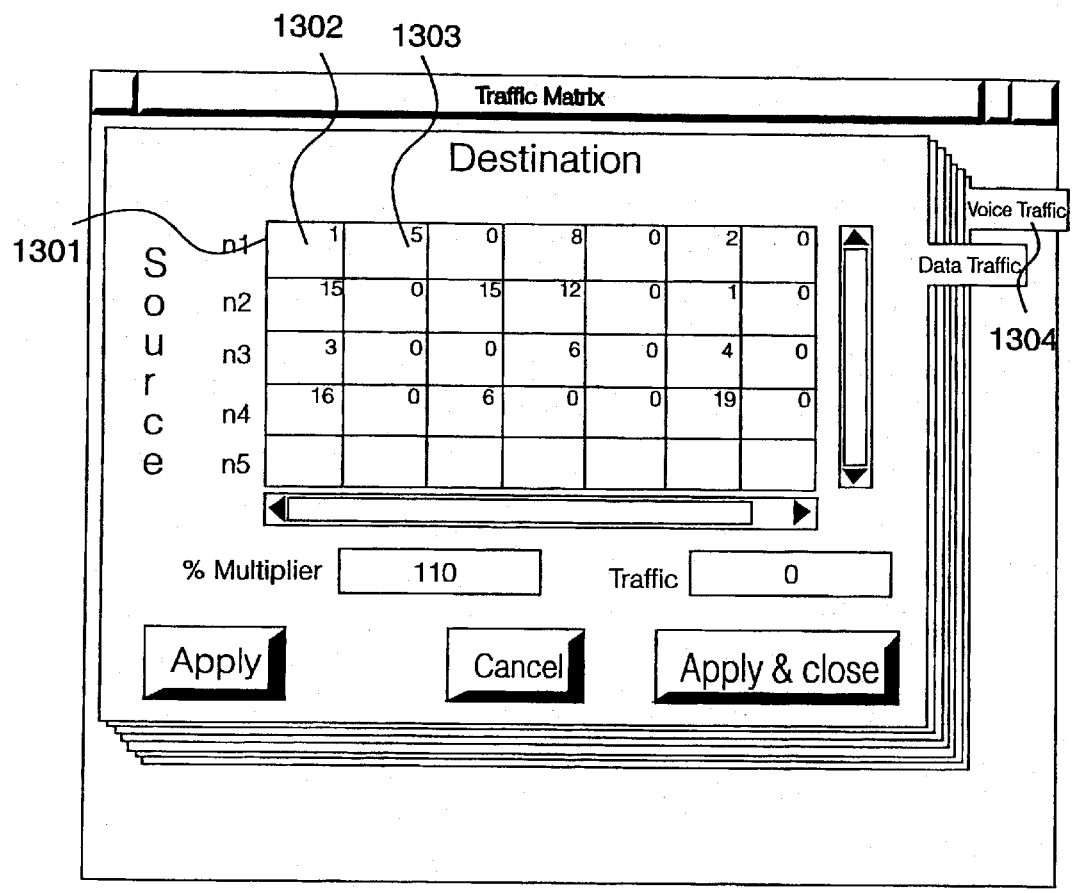
FIG. 13 illustrates diagramatically a screen display produced by the graphical user interface identified in FIG. 4 which can be used to generate a service request data.

FIG. 13 of the accompanying drawings illustrates a screen display which can be used to generate service requests. The screen display is generated by a service request generator, part of the GUI 211, which may be used to generate service requests for the route finder engine 401 as an alternative to service request pre-processor 400 receiving service requests from an external application and converting them to a SAP file. The screen display comprises a two dimensional table in which vertical entries 1301 represent source nodes and horizontal entries 1302 represent destination nodes of connections. Entries 1303 in the table represent service request numbers for connections between the entry's source and destination nodes. The display also includes a selector 1304 used to select the type of traffic, eg voice or data, required by the service requests.

Figure 14:
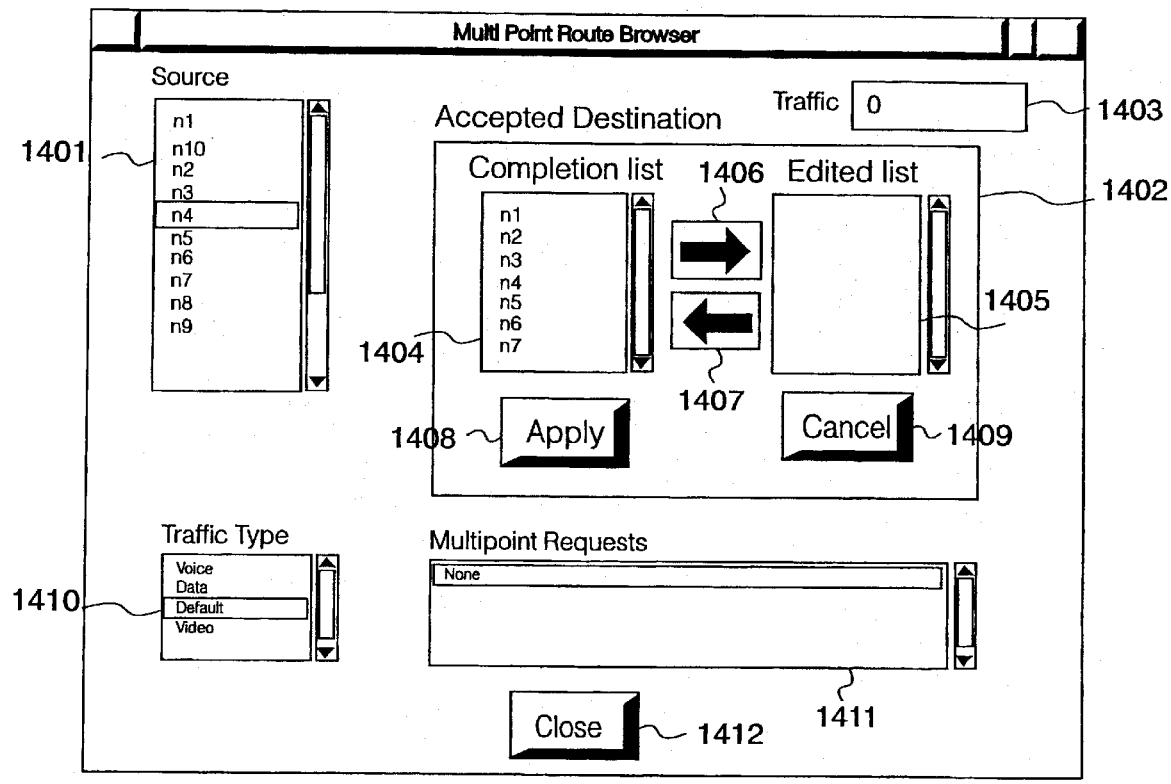
FIG. 14 illustrates diagramatically a screen display produced by the graphical user interface identified in FIG. 4 which can be used to view or create point to multi-point connections.

FIG. 14 of the accompanying drawings illustrates a screen display which may be used to view of create routes for point to multipoint connections. The screen display may be generated by means of GU211. The screen display comprises a scroll box 1401 which may be used to select a source node for the connection. The screen display also comprises an accepted destination box 1402 comprising a completion list 1404, an edited list 1405, a right arrow icon 1406, a left arrow icon 1407, an apply button 1408 and a cancel button 1409. The completion list 1404 may comprise a scroll box containing a list of all or some of the network's nodes which may be selected as destination nodes in a point to multipoint connection. Selecting a node from list 1404, eg by clicking on it with a mouse pointer, and then clicking the right arrow icon 1406 may enter the selected node into edited list 1405. Nodes appearing in a scroll box comprising edited list 1405 may be selected by clicking with the mouse pointer. Clicking left arrow icon 1407 after selecting one or more nodes from edited list 1405 may result in the selected node being removed from the edited list. Selecting apply button 1408 may result in applying the selected destination node to a particular point to multipoint connection. Selecting cancel button 1409 may discard any operations performed upon elements of accepted destination box 1402.

The screen display also comprises a traffic selection box 1403, which may be used to enter a numerical value denoting a required bandwidth of a point to multipoint connection. The screen display also comprises a traffic type selection scroll box 1410, which may be used to select a type of traffic to be used on a particular connection, the types may comprise voice, data, default or video. The screen display further comprises a multipoint requests scroll box 1411 which may be used to display connections selected using source and destination boxes 1401, 1402. The multipoint request box 1411 may display a connection comprising a source node selected using source box 1401 and destination nodes selected using the lists in accepted destination box 1402 and confirmed using apply button 1408. The screen display also comprises close button 1412 which may be used to exit the screen display.

Figure 15:
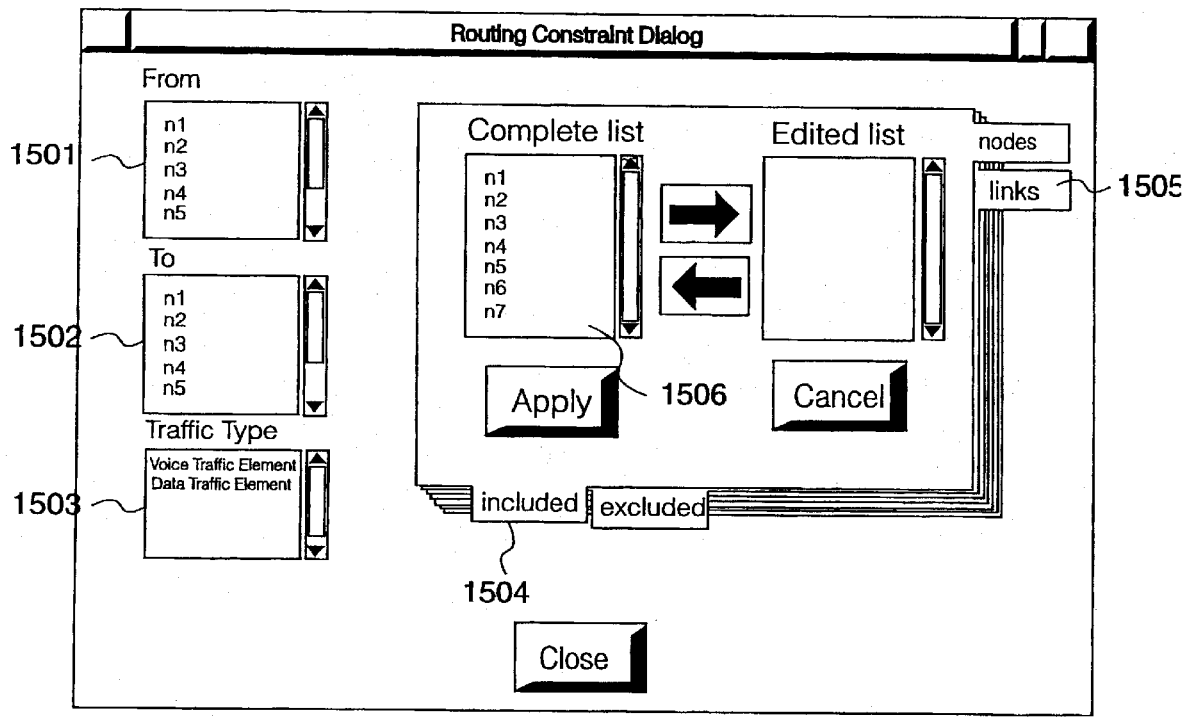
FIG. 15 illustrates diagramatically a screen display produced by the graphical user interface identified in FIG. 4 which may be used to create or edit data representing constraints on routes found for specified service request.

FIG. 15 of the accompanying drawings illustrates a screen display which can be used to create or edit data representing constraints on routes found for specified service requests. The screen display is generated by a constraints data creator part of the GUI 211, which may be used as an alternative to traffic data preprocessor 400 receiving service requests from an external application including route constraints and converting them to a SAP file. The screen display comprises a dialog containing a scroll box 1501 which may be used to select a source node. The display also comprises a scroll box 1502 which may be used to select destination node(s). The display also comprises a scroll box 1503 used to select the traffic type between the selected source and destination nodes which is to be constrained. The display comprises two selection boxes 1505 used to select whether nodes or links are to be selected. Two buttons 1504 are also used to select whether the selected nodes or links will be excluded or included from the route. A list of nodes or links 1506 is also shown in the display, depending upon whether nodes or links were selected using selection boxes 1505. Nodes or links may be selected from list 1506 in order to generate constraints which will be included or excluded for routes found between the selected source and destination nodes selected using scroll boxes 1501 and 1502, respectively.

FIG. 16 of the accompanying drawings illustrates an example text file having SAP format which may be entered into the route finder engine from an external application via service request pre-processor 400 or by the traffic data editors shown in FIG. 13 and FIG. 14. The example shown in FIG. 16 illustrates sections defining data relating to network traffic. The SAP file comprises a number of sections, with each section having a header line and one or more description lines.

Service requests having one source node and one destination node (called point to point service requests) are described in a traffic section. A header line 1501 for a traffic section comprises:

[traffic]

A description line 1602 for a point-to-point service request comprises a numerical identifier for the service request, a source node label, a destination node label, a numerical value denoting capacity required by the service, a traffic type identifier and a numerical value denoting number of routes over which to split total capacity requirement, and a splitting mechanism. The splitting mechanism may be a symbol * indicating that the route finder engine determines a percentage split of traffic over the indicated number of routes, rather than this split being determined in the service equipment. An example description line for a connection request is:

983 n_1 n_8 165 data {5*}

This example specifies that a service request identified as service request 983 comprises a point to point request for service connection between node n_1 and n_8 having a consumption of 165 units of bandwidth, and which is to use 5 routes. The symbol * denotes that the percentages of data traversing each of the routes are to be determined by the generic route finder engine.

Alternatively, the point to point service request description line will include numerical values instead of the symbol * which denotes the percentage split, for example to split capacity equally (50% to 50%) over two routes. For example:

984 n_2 n_3 210 voice {2 50 50}

In this example, the service request identified as number 984 between node n_2 and n_3 having capacity consumption of 210 units carries voice data traffic over 2 routes split equally at 50% over each route.

Data describing service requests with one source node and two or more destination nodes (called point-to-multipoint service requests) is described in a multi-point section. A header line for a multi-point section 1604 comprises:

[multipoint]

A description line 1605 defining a point to multi-point service request may comprise a numerical service request identifier, a source node label, a plurality of destination node labels and a numerical value denoting capacity required by the service request. For example:

985 n_1{n_2 n_3} 160 data

This example indicates a service request identifier 985 being a multi-point connection between node n_1, and nodes n_2 and n_3 with a bitrate consumption of 160 data units, carrying data type traffic.

Data describing constraints on a service request, ie nodes and/or links which should be included or excluded in a route found for the service request, is described in a constraints section. A header line 1606 for a constraints section comprises:

[constraints]

A description line 1607 defining links which should be included in a route for a particular service request comprises a numerical value corresponding to a defined service request (point to point or point to multi-point), the word "include", the word "link", and a list of one or more links with each link listed comprising two end points (each end point comprising a pair of node labels and ports), eg:

983 include links {{{n_1 1}{n_2 1}{}n_2 2}{n_3 2}}}

This example denotes a service request identified as number 983 including links between port 1 of node n_1 and port 1 of node n_2, and port 2 of node n_2 and port 2 of node n_3.

Similarly, the above could be excluded from route(s) found for the services request by replacing "include" with "exclude".

A description line 1608 defining nodes to be excluded from route(s) found for a particular service request comprises a numerical service request identifier, the word "exclude", the word "node" and a list of node labels, eg:

983{exclude nodes {n_2 n_6}}

Excludes nodes n_2 and n_6 from routes carrying service requests identified by identifier 983.

Similarly, the above nodes could be included from the route(s) found for the service request by replacing "exclude" with "include".

FIG. 17 of the accompanying drawings illustrates an example of a SAP format file. The example file shown in FIG. 17 includes sections defining evaluation function related parameters. Data describing parameters which the route finder engine's genetic algorithms may consider when determining routes for service requests are described in a problem parameters section. A header 1701 for a problem parameters section comprises:

[problemparameters]

Routing objective data 409 which the route finder engine takes into account when finding routes for service requests can be given a weighting in order to determine which route selection to make in certain circumstances. For example if having a short as possible route for each connection was twice as important as balancing utilization of nodes and links across the network then description lines 1702–1703 for a problem parameters section could include:

pathlengthWeight=10 balancingweight=5

Data setting various parameters used by the route finder's genetic algorithms may be given in a GA parameter section. A header line 1704 for a GA parameter section comprises:

[ga parameters]

The GA parameter section's description lines comprise parameters and their values, for example a number of iterations which the route finder may run its genetic algorithms on input data may be set by:

Steps=1000

In practice, the SAP files illustrated in FIG. 12, FIG. 16 and FIG. 17 of the accompanying diagrams may be included in one SAP file and entered into the route finder engine 401.

Figure 18:
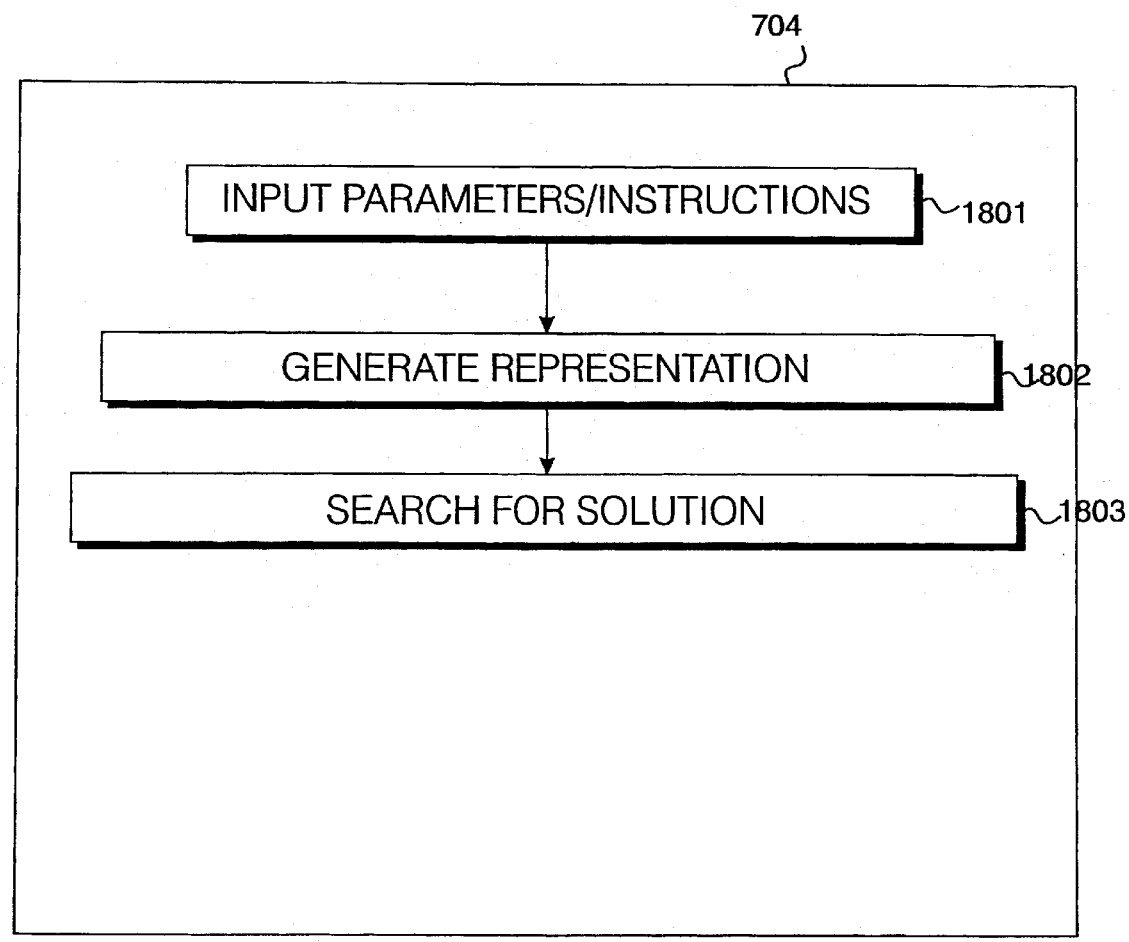
FIG. 18 illustrates schematically steps executed by the route finder engine, including a generate representation step and a search for solution step.

FIG. 18 of the accompanying drawings illustrates steps executed during step 5404 of FIG. 5 which applies the route finder's genetic algorithms to find routes for the service requests entered.

At step 1801 the parameters and instructions are entered into the route finder engine. The parameters which may be entered comprises variables which may be used to control the route finder engine's genetic algorithms. The variables may be given values by using a "set" which has a instruction of the form:

Set <variable name> <value> where <variable name> is a name of a supported route finder engine variable, and <value> is a value to be assigned to the variable.

The variables supported by the GA meter engine comprise:

| Name | Meaning |
| --- | --- |
| crossoverProb | Crossover Probability |
| mutationProb | Mutation Probability |
| poolSize | Size of population |
| miniParents | Minimum number of parents |
| maxParents | Maximum number of parents |
| subpopPercentOfChromosomes | Percent of population selected |
| lambda | Used in exponential selection mechanism |
| bestFitInnacuracy | Used in merging solutions |
| tendencyPressure | Pressure applied in selecting solutions |
| replacePressure | Pressure applied when merging solutions |
| mergeMechanism | Mechanism used when merging solutions |
| crossoverMechanism | Mechanism used in crossover |
| noOfCrossoverpoints | Number of crossover points |
| selectedMechanism | Mechanism used for selection |
| statsCollectionMechanism | Mechanism used for selection |
| statsCollectionMechanism | Collects stats, per generation or new solution |
| randomSeedMechanism | Mechanism used for random seed generation |
| randomSeed | Random seed used |
| terminateAfterTime | Force experiment termination after time |
| maximumTime | Maximum time allowed |
| terminateAfterGens | Force termination after specified generations |
| maximumGens | Maximum generations allowed |
| maximumNoChangeGens | Maximum number of generations allowed without finding a new solution |
| statsFileFormat | Format of statistics file |
| noExperiments | Number of experiments to perform |
| experimentTime | Total experimental time allowed |
| problemFileName | Name of the file containing the Network Data |
| solutionFileName | Name of the file to be used to store solution |
| statisticsFileName | Name of file to be used to store statistics information |
| settingsFileName | Name of file to be used to store the Route Finder engine settings |
| experimentFileName | Name of file containing experimental definitions |
| summaryFileName | Name of the file to be used to store summary information |
| statsUpdateFreq | Frequency with which routes are generated |
| expStatsFileName | Name of the file to be used as a base in computing file names used to store experimental results |
| steps | Number of evaluations to perform before stopping |
| pathLengthWeight | Path length/cost weighting coefficient for objective function |
| balancingWeight | Link utilization balancing weighing coefficient for objective function |
| bestPathSeed | Use the best paths to seed a member of the population |
| variables | Used to get a list of all variables that can be modified/read within the route finder engine, ie the first column of this table |
| numPaths | The number of shortest paths to compute for each point to point traffic demand |
| variables | The variables defined within RouteFinder |
| population | The bitstrings which constitute the current population |
| diversity | A floating point value between 0 and 1 which indicates the genetic variety of the population. A value closer to zero indicating a less-diverse population |
| statistics | Text which describes the performance of RouteFinder |
| cellLossWeight | Weighting associated with the cell loss term in routing objective |
| cellDelayWeight | Weighting associated with cell delay term in routing objective |
| linkReliabilityWeight | Weighting associated with link reliability term in routing objective |
| nodeReliabilityWeight | Weighting associated with node reliability term in routing objective |
| nodeUtilizationWeight | Node utilization balancing weighting coefficient in routing objective |

As illustrated with reference to FIG. 5 herein, the instructions which may be entered into the route finder engine include a "command" instruction. The command instructions are interpreted by engine control process 600 of the route finder generic engine 209 to load or save files, start an optimization process, or terminate operation of the generic route finder engine. A command instruction has a number of distinct forms, including:

command end—this causes the route finder engine to terminate normally command reset—causes a random initial population to generated command run—commences the search for routes for entered service requests command load/save—allows route finder engine data to be loaded or saved to an external store such as a disc drive. Route finder engine data which may be saved or loaded includes the parameter variables and values described above and routes found by the route finder engine.

A batch file comprising "set" and "command" instructions may be created and saved using a filename. Such a batch file may be executed by the route finder engine by an instruction:

execute <filename>.

At step 1802 of FIG. 18 a traffic routing representation is generated. A representation of routes found by the route finder engine for a point-to-multi-point connection for a service request comprises a string of contiguous bits.

Figure 19:
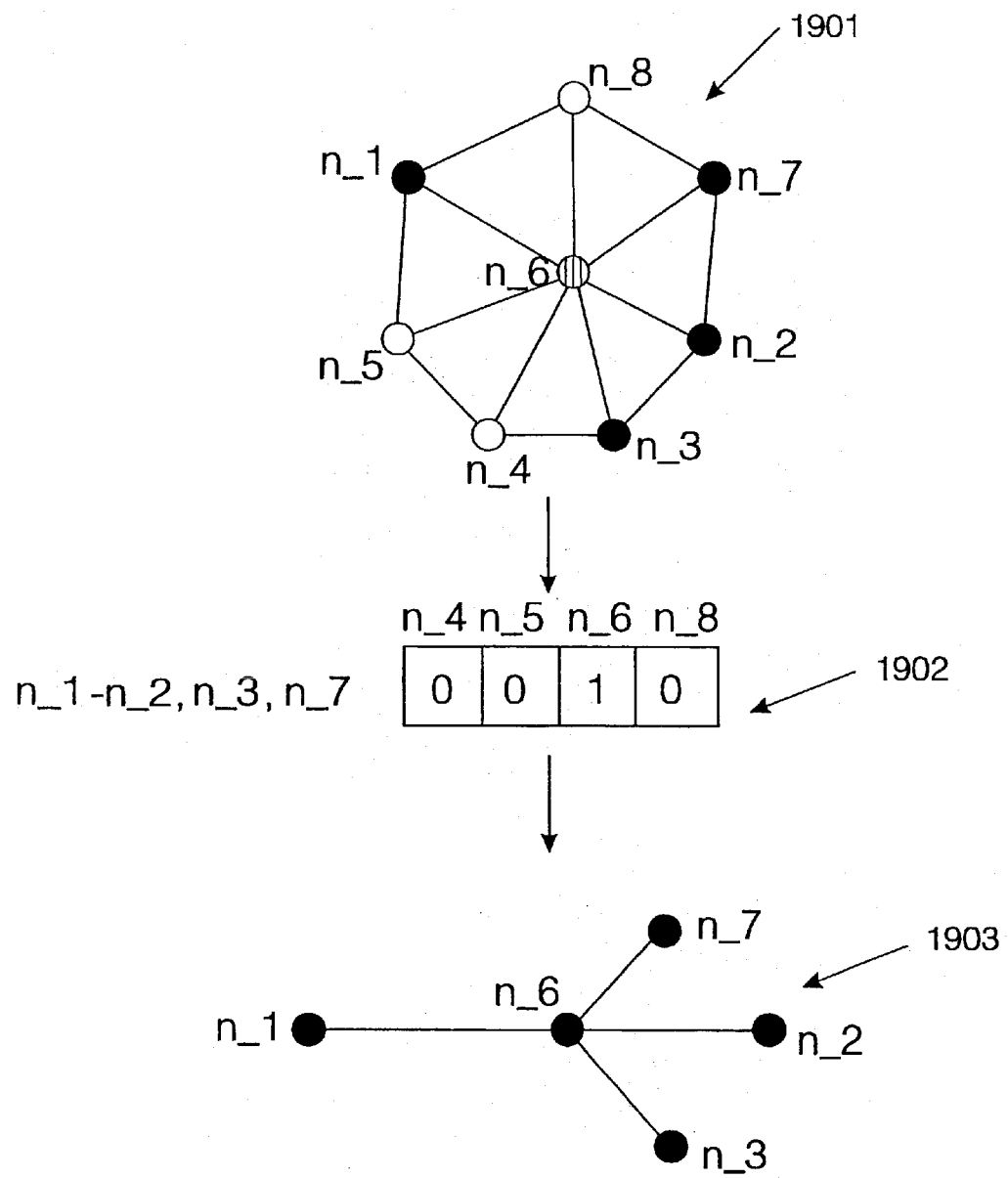
FIG. 19 illustrates bitstrings which may be produced by the generate representation step identified in FIG. 18.

FIG. 19 of the accompanying drawings illustrates a graph 1901 of nodes (labeled n_1 to n_8) and links. For graph 1901 a point-to-multi-point connection request is received specifying source node n_1 and destination nodes n_2, n_3 and n_7. These source and destination nodes are shown in black on the graph. Nodes not included in the point-to-multi-point connection request include nodes n_4, n_5, n_6 and n_8, these nodes are shown as white or hatched in the graph 1901. To generate a traffic routing representation, each node that is not in the point-to-multi-point connection request requires one bit of data storage. This means that for graph 1901 and the point-multi-point connection request four bits will be required to store data about nodes n_4, n_5, n_6 and n_8 in order. In a two dimensional representation of a plurality of nodes connected by a plurality of links, a single source node may be connected to a plurality of destination nodes over a plurality of links. A pattern of links may form a tree structure, where nodes in the tree may form places where branches of the tree may divide. A Steiner tree is a smallest tree connecting all nodes of a specified set of nodes. By smallest tree, it is meant a tree having a minimum number of links. The bits corresponding to nodes not included in the point-to-multi-point connection request are set to zero if they form part of a Steiner tree for the source and destination nodes included in the point-to-multi-point connection request, called Steiner Vertices. The bits are set to zero if they are not Steiner Vertices. For a given set of Steiner Vertices a Steiner tree can be generated using a known minimum spanning tree algorithm such as the Prim Kruskal algorithm. The minimum spanning tree algorithm connects the source node, destination nodes and Steiner Vertices together. In graph 1901 node n_6 only (shown hatched in FIG. 19) is a Steiner Vertex for the point-to-multi-point connection request n_1 to n_2, n_3, n_7. A bit string 1902 representing whether nodes not included in the point-to-multi-point connection request are Steiner Vertices or not for that connection request has values for nodes n_4, n_5, n_6, n_8 of 0, 0, 1, 0, respectively.

Graph 2503 illustrates a Steiner tree of Steiner Vertices for nodes included in the point-to-multi-point connection request n_1 to n_2, n_3, n_7 and nodes which have the value 1 in the representation for that point-to-multi-point connection request (n_6).

At step 1803 of FIG. 18 the route finder engine uses the traffic routing representation to search for routes for entered point-to-multi-point connection requests according to the parameters and instructions entered at step 1801.

Figure 20:
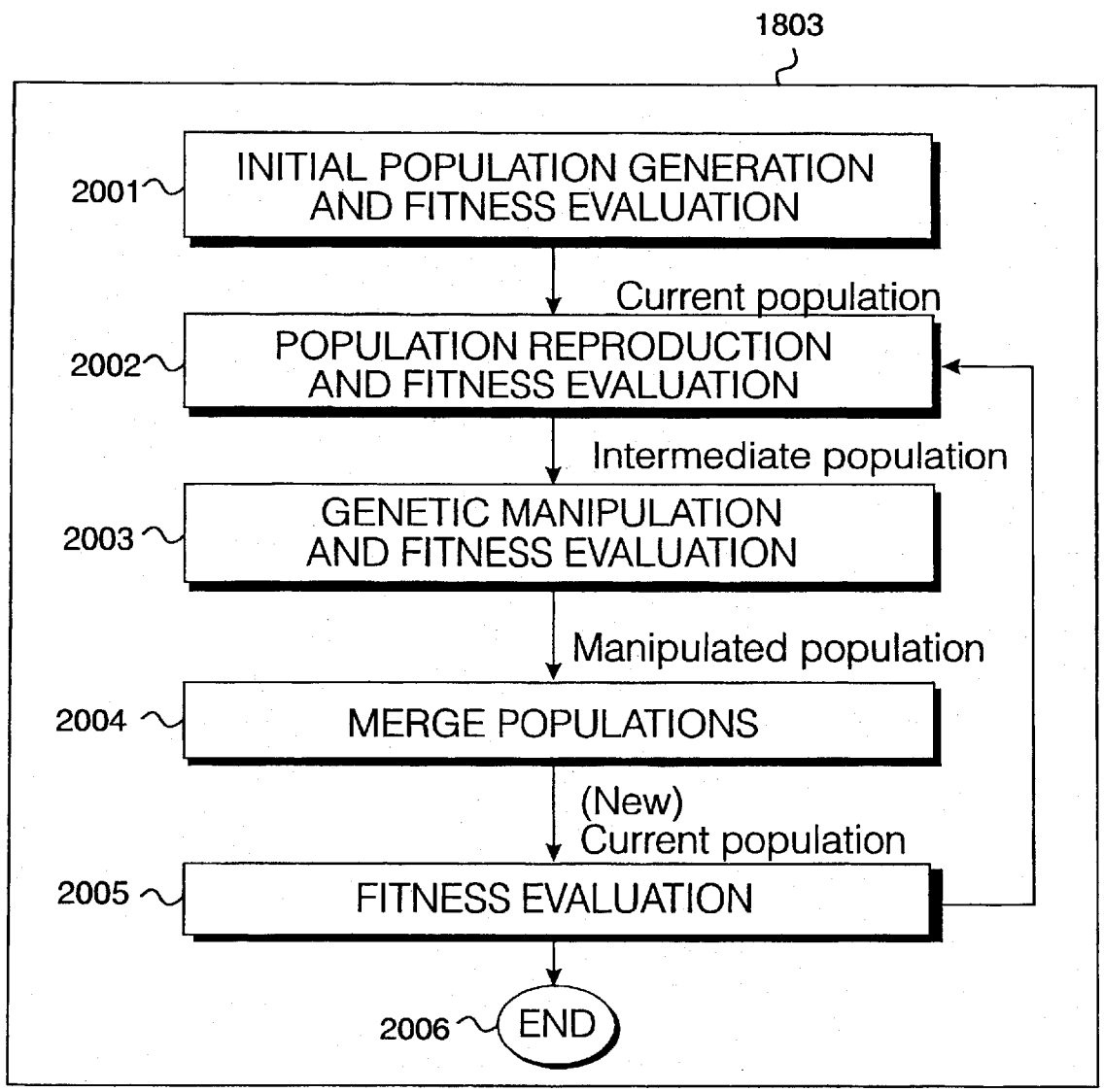
FIG. 20 illustrates schematically steps executed by the search for solution step identified in FIG. 18 including a generate initial population step, fitness evaluation, and genetic manipulation step.

FIG. 20 of the accompanying drawings illustrates steps executed by the route finder engine to route point-to-multi-point connection requests at step 1803 of FIG. 18. At step 2001 an initial population, each member of which comprises a bit string as defined in the generate representation step 1802 above. The initial population generated comprises one or more members, each member having random bit values. Random bit values in the bit strings for each point-to-multi-point connection request represent all intermediate nodes in the network, ie nodes which are not included in the point-to-multi-point connection request and have values of 1 if they are considered to be Steiner Vertices as described hereinabove or 0 otherwise. Output of an initial population generation step is called a current population. A fitness evaluation process is invoked in order to compute a fitness of each current population member. The fitness evaluation process assigns a numerical value to each population member in order that the members can be ranked and used in later steps of FIG. 20. In the route finder engine, the fitness evaluation process indicates increased desirability of a population member by a lower fitness numerical value, that is, the route finder engine's genetic algorithm searches for a minimum numerical value. The fitness numerical value of each population member is calculated by computing a Steiner tree for each point-to-multi-point connection request which results in a bit string as described above. A cost of traversing the network links included in the Steiner tree for the point-to-multi-point connection request is calculated, eg by adding all the link costs for each route in the connection, and a numerical value is produced. A numerical value denoting the fitness evaluation of the population member is then calculated by adding up the numerical cost of each route of each point-to-multi-point connection request in the population member to give a numerical value.

At step 2002 population reproduction occurs to create an intermediate population. The intermediate population is generated by sampling—with replacement—the current population according to a distribution which is fitness related and defined by parameters entered into the route finder engine at step 1801. The intermediate population is the same size as the current population and has a decreased average fitness numerical value, ie more desirable, when compared to that of the current population.

Figure 21:
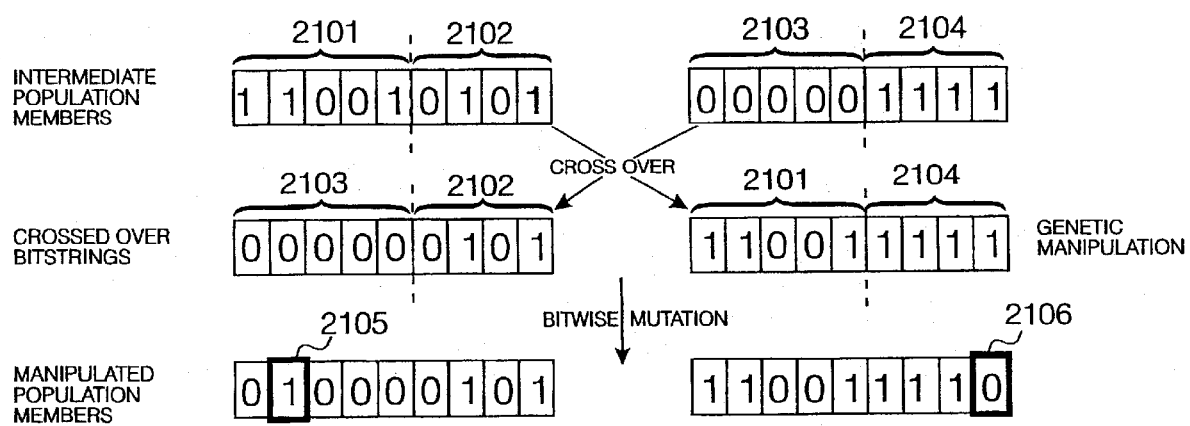
FIG. 21 illustrates schematically steps occurring during the genetic manipulation step identified in FIG. 20.

At step 2003 the intermediate population is genetically manipulated to produce a manipulated population. The genetic manipulation involves cross-over and mutation operations. FIG. 21 of the accompanying diagrams illustrates an example of genetic manipulation. Two intermediate population members, each being a string of nine bits are shown. The cross-over operation involves swapping a number of bits of one population member with another, the number of bits being determined by parameters entered into the route finder engine at step 1801. In the example shown in FIG. 21 a first intermediate population member comprises of five left most bits 2101 and four right most bits 2102. A second intermediate population member comprises five left most bits 2103 and four right most bits 2104. In the example shown we assume that the cross-over operator is set up to swap five left most bits of population members. After the cross-over operation has occurred the first intermediate population member comprises five left most bits 2103 and four right most bits 2102 and the second intermediate population member comprises five left most bits 2101 and four left most bits 2104. After cross-over has occurred a bit wise mutation operation is applied to the crossed-over population members. The mutation operator used is determined by parameters entered into the route finder engine at step 1801. In the example shown in FIG. 21 the bit wise mutation operation results in a single bit of each 9 bit long population member being inverted.

After generating the manipulated population, the fitness evaluation process is invoked in order to compute the fitness values of the manipulated population. Finally, the genetic manipulation process sorts the manipulated population according to fitness value.

At step 2004 a merge populations process is executed. The function of the merge population process is to take members of the current, intermediate and manipulated populations and form a new current population. Mechanisms used in this merged populations process are determined by particular control parameters entered at step 1801. At step 2005 the new current population generated at step 2004 has its fitness evaluated by the fitness evaluation process described above. Depending upon the number of iterations of genetic operations to be performed, determined by parameters entered at step 1801, control may be passed back to step 2002 or the genetic algorithms may terminate at step 2006.

The route finder engine outputs a list of routes corresponding to population members having the minimum fitness numerical value, ie the most desirable. The list of routes is generated by listing the nodes contained in the shortest path array element indexed by the bits for each point-to-point connection request in the fittest population member. The route finder engine outputs an SAP format file with a section describing the routes found for the service requests entered, an example of which is given in FIG. 22 herein. A header line 2201 for a routes section comprises:

[Routes]

A description line for a route sections has the following format:

{<no><source><destination><traffic type>{<routes>}} wherein:

<no> comprises a numerical value corresponding to a service request number.

<source> comprises a label of the point-to-point connection requests source node.

<destination> comprises a label of the point to point connection requests destination node.

<traffic type> comprises the type of traffic being routed, eg data or voice.

<route> comprises a specification of the route found for a point-to-point connection request, specified as:

$\{\{n_1p_1\}\{n_2p_2\} \ldots \{n_mp_m\}\}$ where $n_k$ represents a label of a node in the found route and $p_k$ represents a port used on the node. An example of a route sections of description line 2202 may be:

{983 n_1 n_8 data }{n_1 1}{n_2 1}{n_6 1}{n_8 1}}

A SAP file containing a routes section may be converted by route data post processor 403 into a routing table suitable for the external application which made the service requests.

Figure 23:
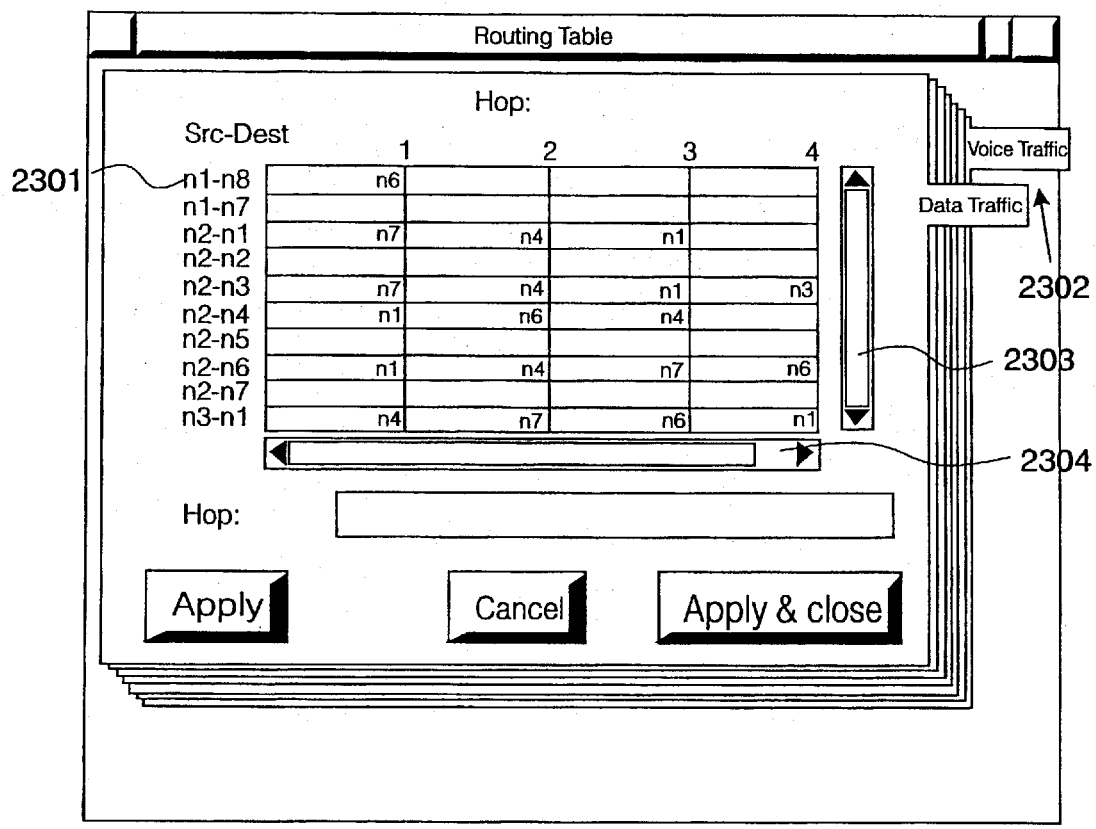
FIG. 23 illustrates diagramatically a screen display produced by the graphical user interface identified in FIG. 4, showing a routing table.

FIG. 23 of the accompanying diagrams illustrates a screen display which GUI 211 may produce to graphically illustrate a routing table using data produced by the route finder engine 209. The screen display comprises a window with a table 2301, each row of which represents a service request between a source node and a destination node of the network and each column of which represents a hop, ie a node contained in a route found for the service request. The screen display also comprises two selection buttons 2302 which may be used to show routing tables for traffic of different types, eg voice or data. The display also comprises a horizontal scroll bar icon 2304 and a vertical scroll bar icon 2303 which may be used to display connection requests and hops not visible in the current display.

Figure 24:
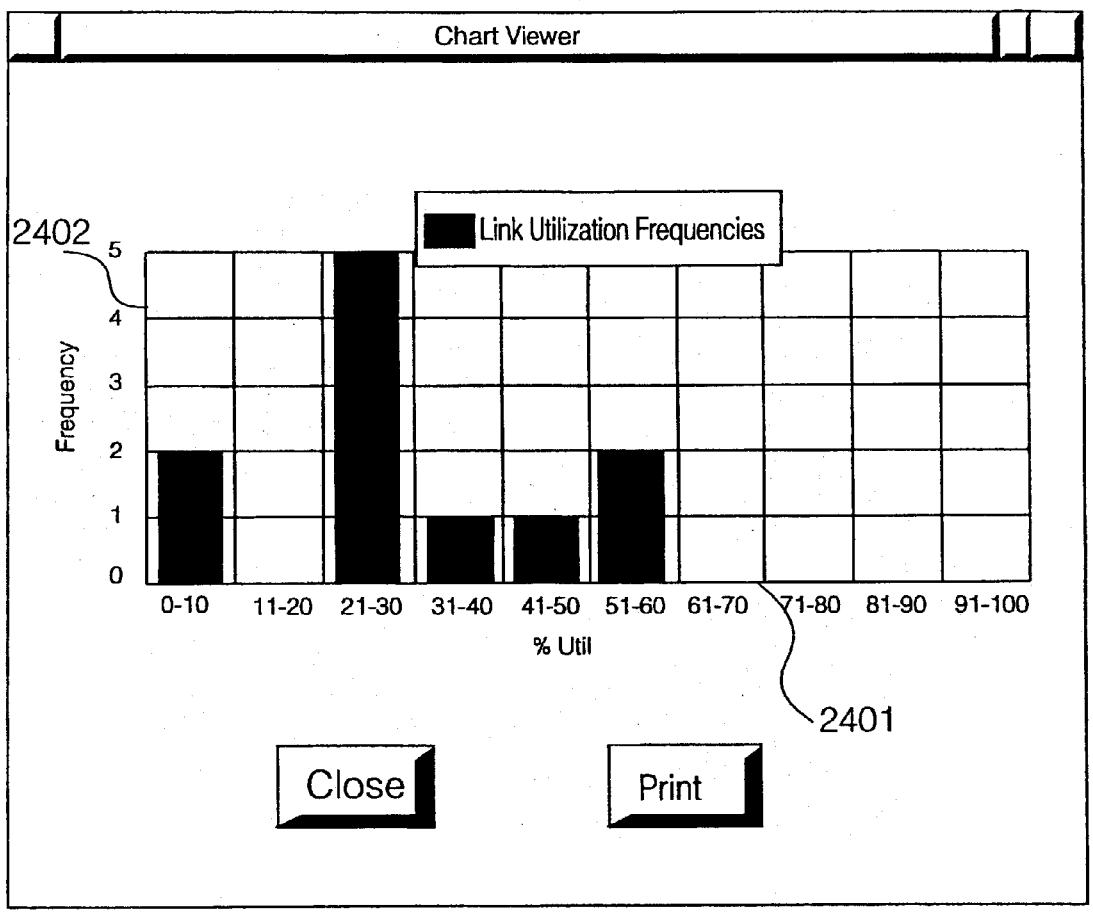
FIG. 24 illustrates diagramatically a screen display produced by the graphical user interface identified in FIG. 4 showing a link utilization chart.

FIG. 24 of the accompanying drawings illustrates a screen display showing a chart produced by GUI 211 using data produced by the route finder engine 209. A horizontal axis 2401 of the chart illustrates percentage utility of links in the network, whilst a vertical axis 2402 of the graph represents frequency of the percentage utilization.

What is claimed is:

1. A method of finding routes of links for a plurality of communications connections over a network comprising a plurality of node elements and link elements, each said connection having a source node element and a plurality of destination node elements, said method comprising the machine executable steps of:

assigning at least one link cost to each said link element;

for each said connection to be routed:

selecting a set of node elements of said network which are not included in a source node element or a plurality of destination node elements of said connection;

determining which of said node elements in said set are Steiner Vertices;

evaluating a route cost of traversing a plurality of link elements between said source node elements and said plurality of destination node elements; and for all said connections to be routed, evaluating a total cost of said route costs.

2. The method according to claim 1, wherein said set of node elements is represented by a string of bits, a bit in said string having a value of 1 if said node element it represents is marked as a Steiner Vertex, and a bit in said string having a value of 0 if said node element it represents is not marked as a Steiner Vertex.

3. The method according to claim 2, wherein said step of evaluating a route cost comprises the steps of:

creating a Steiner tree including nodes in each said connection to be route and nodes in said set which are marked as Steiner Vertices; and adding costs of traversing each link in said Steiner tree.

4. The method according to claim 2, wherein said string of bits is manipulated using genetic algorithm operations, including reproduction, mutation, crossover and merging.

5. The method according to claim 1, wherein said cost(s) assigned to said link element are associated with a data type, and said method comprises the step of:

assigning a data type to all or some of said connections to be routed.

6. The method according to claim 1, comprising the step of:

selecting one or more of said node elements and/or one or more of said link elements to be included or excluded from said route to be found for one or more of said connections to be routed.

7. The method according to claim 1, comprising the step of:

outputting said routes with minimum total cost.

8. The method according to claim 1, wherein a plurality of routes are found for each said connection to be routed, said route cost of each of said plurality of routes not exceeding said connection cost of said connection to be routed.

9. The method according to claim 1, wherein said routes found for all said connections attempt to utilize as many of said node elements and said link elements of said network as possible.

10. The method according to claim 1, wherein said total cost of said route costs of all said connections to be routed is used as a fitness criteria in a genetic algorithm.

11. A method of determining a plurality of routes for a plurality of connections across a network comprising a plurality of nodes and links, each said connection between a source node and a plurality of destination nodes, said method comprising the steps of:

generating a network representation data of said network, said network representation data describing a plurality of interconnected nodes and links;

for each said connection generating a plurality of bit representations of intermediate nodes between said source node and said destination nodes;

for each said connection, evaluating a cost of a set of routes corresponding to one of said intermediate nodes by decoding one of said bit representations as a minimum spanning tree representation;

for all said connections, evaluating a total cost of all corresponding said routes, from said plurality of costs evaluated for said plurality of minimum spanning trees.

12. The method as claimed in claim 11, wherein said step of generating a plurality of bit representations of nodes comprises operating a genetic algorithm technique to produce a plurality of bit strings, each said bit string containing a plurality of said bit representations of nodes, such that each said bit string contains a bit representation of a node for each said connection request.

13. The method as claimed in claim 11, wherein said intermediate nodes correspond to Steiner Vertices.

14. A method of determining a plurality of routes for a plurality of connections across a network comprising a plurality of nodes and links, each said connection having a source node and a plurality of destinations nodes, said method comprising the steps of:

generating a network representation data of said network, said network representation data describing a plurality of interconnected nodes and links of said network wherein each link is assigned a link cost data;

for each of said plurality of connections, representing a plurality of routes of said connection as a minimum spanning tree of nodes and links connecting said source node and said destination nodes of said connections;

for each said connection evaluating a cost of routes represented by said corresponding minimum spanning tree from a plurality of link costs assigned to links of said minimum spanning tree; and determining a total cost of all said connections from said plurality of costs evaluated for each said minimum spanning tree.

* * * * *